United States Patent
Li et al.

(10) Patent No.: US 12,401,203 B2
(45) Date of Patent: Aug. 26, 2025

(54) CHARGING METHOD, BATTERY MANAGEMENT SYSTEM OF TRACTION BATTERY AND CHARGING PILE

(71) Applicant: CONTEMPORARY AMPEREX TECHNOLOGY (HONG KONG) LIMITED, Hong Kong (CN)

(72) Inventors: Zhanliang Li, Ningde (CN); Shuyun Xiong, Ningde (CN); Zhimin Dan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 227 days.

(21) Appl. No.: 17/711,284

(22) Filed: Apr. 1, 2022

(65) Prior Publication Data

US 2022/0239121 A1    Jul. 28, 2022

Related U.S. Application Data

(63) Continuation of application No. PCT/CN2021/074192, filed on Jan. 28, 2021.

(51) Int. Cl.
*B60L 53/62* (2019.01)
*B60L 53/10* (2019.01)
(Continued)

(52) U.S. Cl.
CPC .......... *H02J 7/00036* (2020.01); *B60L 53/11* (2019.02); *B60L 53/62* (2019.02); *B60L 58/12* (2019.02);
(Continued)

(58) Field of Classification Search
CPC .............. H02J 7/00036; H02J 7/00711; H02J 7/007192; B60L 58/27; H01M 10/443; H01M 10/486
(Continued)

(56) References Cited

U.S. PATENT DOCUMENTS 4,385,269 A * 5/1983 Aspinwall ......... H02J 7/007184
                                                    320/152
4,389,608 A * 6/1983 Dahl ........................ H02J 7/02
                                                    320/137
(Continued)

FOREIGN PATENT DOCUMENTS

CA      2128507 C      11/1998
CN      201113509 Y     9/2008
(Continued)

OTHER PUBLICATIONS

Decision to Grant a Patent dated Dec. 18, 2023 received in Japanese Patent Application No. JP 2022-518789.
(Continued)

*Primary Examiner* — John T Trischler
(74) *Attorney, Agent, or Firm* — K&L Gates LLP

(57) ABSTRACT

A charging method is provided, which includes: acquiring a state parameter of a traction battery, the state parameter including a battery temperature; sending first charging mode demand information to a charging pile when the battery temperature is lower than a first preset threshold, where the first charging mode demand information is used for indicating a pulse charging mode, the pulse charging mode is a charging mode using a pulsed voltage or a pulsed current, and the pulsed voltage or the pulsed current is used for charging the traction battery. According to the technical solution of the embodiment of the application, the charging pile can output pulse current to charge the traction battery, so as to prevent the performance of the traction battery from being affected by directly charging the traction battery at a low temperature, thereby ensuring the performance of the traction battery.

19 Claims, 6 Drawing Sheets

(51) Int. Cl.
  *B60L 58/12* (2019.01)
  *B60L 58/27* (2019.01)
  *H01M 10/44* (2006.01)
  *H01M 10/48* (2006.01)
  *H02J 7/00* (2006.01)

(52) U.S. Cl.
  CPC ........... *B60L 58/27* (2019.02); *H01M 10/443* (2013.01); *H01M 10/486* (2013.01); *H02J 7/00045* (2020.01); *H02J 7/0047* (2013.01); *H02J 7/00711* (2020.01); *H02J 7/00712* (2020.01); *H02J 7/007194* (2020.01); *B60L 2240/545* (2013.01); *B60L 2240/547* (2013.01); *H01M 2220/20* (2013.01); *H02J 7/007182* (2020.01); *H02J 7/007192* (2020.01); *H02J 2207/20* (2020.01)

(58) Field of Classification Search
  USPC ........................................................ 320/109
  See application file for complete search history.

(56) References Cited

U.S. PATENT DOCUMENTS

| | | | | |
|---|---|---|---|---|
| 5,307,000 | A | 4/1994 | Podrazhansky et al. | |
| 5,440,221 | A * | 8/1995 | Landau | H01M 10/425 320/155 |
| 5,525,892 | A * | 6/1996 | Phommarath | H02J 7/00711 320/155 |
| 5,548,200 | A * | 8/1996 | Nor | B60L 53/11 320/132 |
| 5,633,574 | A * | 5/1997 | Sage | H01M 10/44 320/152 |
| 5,708,348 | A | 1/1998 | Frey et al. | |
| 5,726,551 | A * | 3/1998 | Miyazaki | B60L 53/12 320/155 |
| 5,773,955 | A * | 6/1998 | Hall | H02J 7/00711 320/108 |
| 5,994,872 | A * | 11/1999 | Hall | H02J 7/02 320/108 |
| 6,124,698 | A * | 9/2000 | Sakakibara | H02J 7/007194 320/160 |
| 6,137,265 | A * | 10/2000 | Cummings | H02J 7/00711 320/133 |
| 6,437,540 | B2 * | 8/2002 | Sonobe | H02J 7/00714 320/136 |
| 6,441,588 | B1 * | 8/2002 | Yagi | B60L 58/27 320/150 |
| 6,685,334 | B2 * | 2/2004 | Kenny | H05B 47/13 362/621 |
| 7,221,125 | B2 * | 5/2007 | Ding | H02J 7/00711 320/139 |
| 8,334,675 | B2 * | 12/2012 | Wang | H02J 7/007192 320/129 |
| 8,378,626 | B2 * | 2/2013 | Wang | H02J 7/00 320/140 |
| 8,493,024 | B2 * | 7/2013 | Kissel, Jr. | B60M 1/10 320/109 |
| 8,698,458 | B2 * | 4/2014 | Kim | H02J 7/00711 320/164 |
| 8,847,544 | B2 * | 9/2014 | Ang | H02J 7/007192 320/150 |
| 8,907,631 | B1 * | 12/2014 | Gurries | G01K 13/00 320/141 |
| 9,331,364 | B2 * | 5/2016 | Ramaswamy | H01M 10/052 |
| 9,409,487 | B2 * | 8/2016 | Shao | B60L 53/665 |
| 9,469,202 | B2 * | 10/2016 | Miglioranza | B60L 50/64 |
| 9,496,735 | B2 * | 11/2016 | Sarkar | B60L 58/16 |
| 9,500,713 | B1 * | 11/2016 | Ghantous | G01R 31/3835 |
| 9,623,761 | B2 * | 4/2017 | Gale | B60L 53/60 |
| 9,673,657 | B2 * | 6/2017 | van Lammeren | H02J 7/00712 |
| 9,751,419 | B2 * | 9/2017 | Kwon | B60L 53/36 |
| 9,793,733 | B2 * | 10/2017 | Hempel | H01M 10/443 |
| 9,866,056 | B2 * | 1/2018 | Ramaswamy | H01M 10/425 |
| 9,912,181 | B2 * | 3/2018 | Gurries | H02J 7/007192 |
| 9,966,639 | B2 * | 5/2018 | Hase | G01R 31/371 |
| 9,969,288 | B2 * | 5/2018 | Ikeda | B60L 53/14 |
| 9,991,726 | B2 * | 6/2018 | Small, Jr. | H02J 7/0071 |
| 10,084,333 | B2 * | 9/2018 | Zeng | H02J 7/007 |
| 10,166,882 | B2 * | 1/2019 | Yang | B60L 53/00 |
| 10,186,887 | B2 * | 1/2019 | Wang | B60L 58/12 |
| 10,193,366 | B2 * | 1/2019 | Josephs | H02J 7/0013 |
| 10,195,950 | B2 * | 2/2019 | Dow | B60L 53/305 |
| 10,256,512 | B2 * | 4/2019 | Sun | H02J 7/007194 |
| 10,259,338 | B2 * | 4/2019 | Bryngelsson | H01M 10/615 |
| 10,279,700 | B2 * | 5/2019 | Takebayashi | B60L 58/13 |
| 10,886,757 | B2 * | 1/2021 | Zuo | H01M 10/425 |
| 10,933,767 | B2 * | 3/2021 | Javaid | G06Q 20/02 |
| 11,075,524 | B2 * | 7/2021 | Small, Jr. | H02J 7/00 |
| 11,177,676 | B2 * | 11/2021 | Liu | B60L 53/14 |
| 11,299,057 | B2 * | 4/2022 | Lemke | B60L 3/0046 |
| 11,327,119 | B2 * | 5/2022 | Pressas | H02J 7/00711 |
| 11,355,793 | B2 * | 6/2022 | Yamamoto | B60L 50/64 |
| 11,390,178 | B1 * | 7/2022 | Wiegman | B60L 53/16 |
| 11,397,215 | B2 * | 7/2022 | Ghantous | H02J 7/0047 |
| 11,397,216 | B2 * | 7/2022 | Ghantous | H02J 7/007182 |
| 11,398,744 | B2 * | 7/2022 | Sun | H02J 7/007192 |
| 11,404,896 | B2 * | 8/2022 | Du | H02J 7/007188 |
| 11,440,429 | B2 * | 9/2022 | Lim | B60L 50/61 |
| 11,462,774 | B2 * | 10/2022 | Zhang | H01M 4/587 |
| 11,485,517 | B1 * | 11/2022 | Wiegman | H02J 7/00034 |
| 11,515,588 | B2 * | 11/2022 | Du | H01M 10/633 |
| 11,575,273 | B2 * | 2/2023 | Rauner | B60L 53/62 |
| 11,616,382 | B2 * | 3/2023 | Hale | H02J 7/007182 320/141 |
| 11,646,597 | B2 * | 5/2023 | Surampudi | H01M 10/486 320/145 |
| 11,719,755 | B2 * | 8/2023 | Pressas | H02J 7/04 324/430 |
| 11,848,426 | B2 * | 12/2023 | Zhang | H02J 7/0047 |
| 12,237,477 | B2 * | 2/2025 | Zhang | G01R 31/392 |
| 2001/0011883 | A1 * | 8/2001 | Sonobe | H02J 7/0047 320/134 |
| 2002/0070710 | A1 * | 6/2002 | Yagi | B60L 58/27 320/150 |
| 2003/0202344 | A1 * | 10/2003 | Kenny | H05B 47/13 362/276 |
| 2005/0099162 | A1 * | 5/2005 | Ding | H02J 7/00711 320/141 |
| 2008/0042621 | A1 * | 2/2008 | Miglioranza | H02J 7/1407 320/150 |
| 2008/0100265 | A1 * | 5/2008 | Lim | H02J 7/00711 320/134 |
| 2010/0225269 | A1 * | 9/2010 | Liu | H01M 10/44 320/134 |
| 2010/0320965 | A1 * | 12/2010 | Kissel, Jr. | B60L 53/32 320/109 |
| 2011/0106336 | A1 * | 5/2011 | Eikeland | B60L 53/11 348/148 |
| 2011/0273139 | A1 * | 11/2011 | Hofheinz | B60L 53/11 320/109 |
| 2012/0007547 | A1 * | 1/2012 | Kim | H02J 7/0069 320/150 |
| 2012/0025773 | A1 * | 2/2012 | Wang | H02J 7/00714 320/129 |
| 2012/0112696 | A1 * | 5/2012 | Ikeda | H01M 10/48 320/109 |
| 2012/0112703 | A1 * | 5/2012 | Xu | H02J 7/0013 320/145 |
| 2012/0116575 | A1 * | 5/2012 | Prosser | B60L 53/18 705/14.38 |
| 2012/0161925 | A1 * | 6/2012 | Gale | B60L 53/62 340/5.1 |
| 2012/0319643 | A1 * | 12/2012 | Wang | H02J 7/00 320/107 |
| 2013/0057213 | A1 * | 3/2013 | Kuraishi | B60L 3/0046 320/109 |
| 2013/0058379 | A1 * | 3/2013 | Kim | H04B 5/72 455/69 |

(56) References Cited

U.S. PATENT DOCUMENTS

| | | | | |
|---|---|---|---|---|
| 2013/0219084 A1* | 8/2013 | Wu | G06F 3/00 | |
| | | | | 710/11 |
| 2013/0229153 A1* | 9/2013 | Sarkar | B60L 3/04 | |
| | | | | 320/137 |
| 2013/0249495 A1* | 9/2013 | Ang | H02J 7/04 | |
| | | | | 320/134 |
| 2014/0035530 A1* | 2/2014 | Shao | H02J 7/00304 | |
| | | | | 320/109 |
| 2014/0266068 A1* | 9/2014 | O'Brien | B60L 3/003 | |
| | | | | 320/139 |
| 2014/0327406 A1* | 11/2014 | Hempel | H01M 10/443 | |
| | | | | 320/129 |
| 2015/0137741 A1* | 5/2015 | Gurries | G01K 13/00 | |
| | | | | 320/150 |
| 2015/0221990 A1* | 8/2015 | Ramaswamy | H01M 10/052 | |
| | | | | 204/229.4 |
| 2015/0288213 A1* | 10/2015 | van Lammeren | H01M 10/486 | |
| | | | | 320/153 |
| 2016/0023563 A1* | 1/2016 | Wang | B60L 58/24 | |
| | | | | 320/152 |
| 2016/0031333 A1* | 2/2016 | Dow | B60L 53/38 | |
| | | | | 307/10.1 |
| 2016/0089989 A1* | 3/2016 | Park | B60L 53/62 | |
| | | | | 320/108 |
| 2016/0107534 A1* | 4/2016 | Ikeda | H01M 10/44 | |
| | | | | 307/9.1 |
| 2016/0129799 A1* | 5/2016 | Kwon | B60L 53/38 | |
| | | | | 320/108 |
| 2016/0152151 A1* | 6/2016 | Yang | B60L 58/27 | |
| | | | | 320/109 |
| 2016/0185234 A1* | 6/2016 | Miglioranza | B60L 50/64 | |
| | | | | 320/150 |
| 2016/0204624 A1* | 7/2016 | Small, Jr. | H02J 7/0047 | |
| | | | | 320/139 |
| 2016/0204625 A1* | 7/2016 | Josephs | H02J 7/0048 | |
| | | | | 320/139 |
| 2016/0218522 A1* | 7/2016 | Ramaswamy | H01M 10/4242 | |
| 2017/0117595 A1* | 4/2017 | Hase | H01M 10/482 | |
| 2017/0136888 A1* | 5/2017 | Ricci | B60M 7/003 | |
| 2017/0136889 A1* | 5/2017 | Ricci | B60L 53/126 | |
| 2017/0256961 A1* | 9/2017 | Zeng | G01R 31/3842 | |
| 2018/0134173 A1* | 5/2018 | Takebayashi | G01R 31/36 | |
| 2018/0162232 A1* | 6/2018 | Bryngelsson | B60L 9/00 | |
| 2018/0241098 A1* | 8/2018 | Kang | H02J 7/007182 | |
| 2018/0257492 A1* | 9/2018 | O'Hara | H02J 7/0032 | |
| 2018/0287404 A1* | 10/2018 | Small, Jr. | H02J 7/0047 | |
| 2018/0339597 A1 | 11/2018 | Kruszelnicki | | |
| 2018/0339601 A1* | 11/2018 | Kruszelnicki | B60L 53/16 | |
| 2019/0027792 A1 | 1/2019 | Sun et al. | | |
| 2019/0072618 A1* | 3/2019 | Ghantous | H02J 7/005 | |
| 2019/0120910 A1* | 4/2019 | Ghantous | G01R 31/392 | |
| 2019/0229378 A1* | 7/2019 | Zhang | B60L 58/12 | |
| 2019/0285703 A1* | 9/2019 | Juva | H02J 7/00047 | |
| 2019/0293723 A1* | 9/2019 | Pressas | H02J 7/04 | |
| 2019/0363408 A1* | 11/2019 | Dan | H05B 1/023 | |
| 2019/0363550 A1* | 11/2019 | Zuo | H01M 10/425 | |
| 2020/0215929 A1* | 7/2020 | Javaid | B60L 55/00 | |
| 2020/0259373 A1* | 8/2020 | Park | H02J 50/80 | |
| 2020/0381784 A1* | 12/2020 | Yamamoto | H02J 7/007194 | |
| 2020/0381788 A1* | 12/2020 | Du | H01M 10/633 | |
| 2020/0406766 A1* | 12/2020 | Liu | H02J 7/00711 | |
| 2021/0001743 A1* | 1/2021 | Rauner | B60L 53/305 | |
| 2021/0066947 A1* | 3/2021 | Du | H02J 7/007182 | |
| 2021/0075069 A1* | 3/2021 | Zuo | H01M 10/63 | |
| 2021/0188111 A1* | 6/2021 | Lemke | H01M 10/44 | |
| 2021/0194264 A1* | 6/2021 | Hale | H02J 7/00711 | |
| 2021/0218263 A1* | 7/2021 | Sun | H01M 10/443 | |
| 2021/0328448 A1* | 10/2021 | Konopka | H02J 7/00712 | |
| 2021/0384746 A1* | 12/2021 | Zeiler | B60L 58/16 | |
| 2022/0001764 A1* | 1/2022 | Lim | H01M 10/48 | |
| 2022/0024335 A1* | 1/2022 | O'Gorman | H02J 7/00045 | |
| 2022/0077712 A1* | 3/2022 | Surampudi | H02J 7/007194 | |
| 2022/0173606 A1* | 6/2022 | Mihara | H01M 10/44 | |
| 2022/0221521 A1* | 7/2022 | Pressas | H02J 7/0047 | |
| 2022/0236333 A1* | 7/2022 | Liu | G01R 31/392 | |
| 2022/0239120 A1* | 7/2022 | Sun | H02J 7/00032 | |
| 2022/0239127 A1* | 7/2022 | Sun | B60L 53/31 | |
| 2022/0239135 A1* | 7/2022 | Li | H02J 7/06 | |
| 2022/0239140 A1* | 7/2022 | Li | B60L 53/22 | |
| 2022/0255336 A1* | 8/2022 | Li | H01M 10/48 | |
| 2022/0281345 A1* | 9/2022 | Kim | G06Q 50/40 | |
| 2022/0314742 A1* | 10/2022 | Miyakoshi | B60L 58/12 | |
| 2022/0317198 A1* | 10/2022 | Ghantous | H01M 10/44 | |
| 2022/0407322 A1* | 12/2022 | Svedlund | H04B 3/542 | |
| 2022/0407338 A1* | 12/2022 | Li | H02J 7/0048 | |
| 2023/0040026 A1* | 2/2023 | Zhang | H01M 10/44 | |
| 2023/0046587 A1* | 2/2023 | Zou | H02J 7/0048 | |
| 2023/0053872 A1* | 2/2023 | Wiegman | B60L 53/305 | |
| 2023/0064624 A1* | 3/2023 | Huang | H02J 7/0049 | |
| 2023/0070522 A1* | 3/2023 | Xiong | H01M 10/44 | |
| 2023/0076134 A1* | 3/2023 | Xiong | H01M 10/44 | |
| 2023/0182575 A1* | 6/2023 | Kim | G06Q 30/012 | |
| | | | | 701/22 |
| 2024/0120558 A1* | 4/2024 | Zhang | H01M 4/583 | |
| 2024/0385258 A1* | 11/2024 | Peng | H01M 10/441 | |

FOREIGN PATENT DOCUMENTS

| | | |
|---|---|---|
| CN | 102544609 A | 7/2012 |
| CN | 103117421 A | 5/2013 |
| CN | 105291875 A | 2/2016 |
| CN | 105680541 A | 6/2016 |
| CN | 105932747 A | 9/2016 |
| CN | 104578291 B | 2/2017 |
| CN | 108845273 B | 11/2020 |
| DE | 102017206334 A1 | 11/2017 |
| JP | 2000197212 A | 7/2000 |
| JP | 2002125326 A | 4/2002 |
| JP | 2015176821 A | 10/2015 |
| JP | 2017523756 A | 8/2017 |
| WO | 2011122946 A2 | 10/2011 |
| WO | 2012066543 A1 | 5/2012 |
| WO | 2012165072 A1 | 12/2012 |
| WO | 2017128724 A1 | 8/2017 |

OTHER PUBLICATIONS

Extended European Search Report dated Feb. 28, 2023 received in European Patent Application No. EP 21867887.8.

Notice of Reasons for Refusal dated Jun. 5, 2023 received in Japanese Patent Application No. JP 2022-518789.

* cited by examiner

CHARGING METHOD, BATTERY MANAGEMENT SYSTEM OF TRACTION BATTERY AND CHARGING PILE

CROSS-REFERENCE TO RELATED APPLICATIONS

This application is a continuation of International Application No. PCT/CN2021/074192, filed on Jan. 28, 2021, the disclosure of which is hereby incorporated by reference in its entirety.

FIELD OF TECHNOLOGY

The present application relates to the field of traction batteries, in particular to a charging method, a battery management system of a traction battery and a charging pile.

BACKGROUND

With the development of the times, electric vehicles have a huge market prospect and can effectively promote energy saving and emission reduction, which is beneficial to the development and progress of society due to their high environmental protection, low noise, low cost of use and other advantages.

For electric vehicles, traction battery technology is an important factor in their development. Due to the electrochemical characteristics of the traction battery, direct current charging will have a greater impact on the performance of the traction battery in a low-temperature environment, which affects the customer's experience with the electric vehicle.

Therefore, how to ensure the battery performance of traction batteries is a technical problem to be solved.

SUMMARY

An embodiment of the present application provides a charging method, a battery management system of a traction battery and a charging pile, which can ensure the battery performance of the traction battery.

In a first aspect, a charging method is provided, which includes sending first charging mode demand information to a charging pile when the battery temperature is lower than a first preset threshold, where the first charging mode demand information is used for indicating a pulse charging mode, the pulse charging mode is a charging mode using a pulsed voltage or a pulsed current, and the pulsed voltage or the pulsed current is used for charging the traction battery.

Through the technical solution of the embodiment of the present application, the battery management system acquires a battery temperature of the traction battery, when the battery temperature is low, for example, when it is lower than a first preset threshold, first charging mode demand information indicating a pulse charging mode is sent to a charging pile. The charging pile can output pulse electricity to charge the traction battery in the pulse charging mode, so as to prevent performance of the traction battery from being affected by directly charging the traction battery at a low temperature, thereby ensuring the performance of the traction battery. In addition, through the technical solution of the embodiment of the application, the traction battery does not need to be configured with a thermal management system, and on the basis of reducing the overall cost of the traction battery, the heating time of the traction battery at a low temperature is saved, and the charging efficiency is improved.

In some possible implementations, the method also includes sending second charging mode demand information to the charging pile when the battery temperature is not lower than the first preset threshold, the second charging mode demand information being used for indicating a direct current charging mode, the direct current charging mode being a charging mode using a constant voltage or a constant current, the constant voltage or constant current being used for charging the traction battery.

Through the technical solution of the embodiment of the present application, the battery management system can continuously acquire the battery temperature of the traction battery. When the traction battery is in a non-low temperature state, for example, when the temperature of the traction battery is not lower than the first preset threshold, second charging mode demand information indicating a direct current charging mode is sent to the charging pile. The charging pile can output direct current to charge the traction battery in the direct current charging mode, and the charging efficiency of the traction battery in the non-low temperature is improved. Therefore, through the technical solution of the embodiment of the present application, the battery management system can flexibly send different charging mode demand information to the charging pile according to the battery temperature of the traction battery, and the charging efficiency of the whole charging process is improved on the premise of ensuring the performance of the traction battery.

In some possible implementations, the state parameter also includes a battery voltage, and the sending the first charging mode demand information to the charging pile when the battery temperature is lower than a first preset threshold includes: sending the first charging mode demand information to the charging pile when the battery temperature is lower than the first preset threshold and the battery voltage is lower than a second preset threshold.

In some possible implementations, the state parameter also includes a battery voltage, and the sending the second charging mode demand information to the charging pile when the battery temperature is not lower than the first preset threshold includes: sending the second charging mode demand information to the charging pile when the battery temperature is not lower than the first preset threshold or the battery voltage is not lower than the second preset threshold.

Through the technical solution of the embodiment of the present application, the battery management system not only acquires the battery temperature of the traction battery, but also acquires the battery voltage of the traction battery, and judges the charging mode of the traction battery by integrating the information of both the battery temperature and the battery voltage. When the traction battery is in a low temperature state and in a low voltage pending charging state, the charging pile outputs pulse electricity to charge the traction battery, thereby further ensuring the charging safety, and in the non-low temperature or when the traction battery is in a high voltage state, the charging pile outputs direct current to charge the traction battery, thereby improving the charging efficiency.

In some possible implementations, the first charging mode demand information includes at least one of following information: pulse current demand information, pulse voltage demand information, pulse direction demand information and pulse frequency demand information, and the first charging mode demand information is determined according to the battery temperature and a state-of-charge of the traction battery.

Through the technical solution of the embodiment of the present application, the first charging mode demand information can directly include pulse electricity demand information in the pulse charging mode, and on the basis that the charging pile supports the pulse charging mode, the charging pile may directly and quickly enter the pulse charging mode. In the pulse charging mode, the charging pile directly outputs a pulsed voltage or a pulsed current to the traction battery according to the pulse power demand information in the first charging mode demand information, so as to improve the charging efficiency and the charging speed.

In some possible implementations, before the sending first charging mode demand information to the charging pile, the method further includes: receiving an output capability message sent by the charging pile, the output capability message being used for carrying a first charging parameter of the charging pile in the pulse charging mode; and confirming that the charging pile matches the traction battery according to the first charging parameter.

In some possible implementations, the first charging parameter includes at least one of following parameters: a minimum pulse charging current, a minimum pulse charging voltage, a minimum pulse charging frequency, a maximum pulse charging current, a maximum pulse charging voltage, a maximum pulse charging frequency, and a pulse waveform that can be output.

In some possible implementations, before the sending first charging mode demand information to the charging pile, the method further includes: sending a charging parameter message to the charging pile, the charging parameter message being used for carrying a second charging parameter allowed by the traction battery in the pulse charging mode, and the second charging parameter being used for judging whether the traction battery matches the charging pile.

In some possible implementations, the second charging parameter includes at least one of following parameters: a maximum allowable pulse charging current, a maximum allowable pulse charging voltage, and a maximum allowable pulse charging frequency.

Through the technical solution of the embodiment of the present application, the charging pile can receive the second charging parameter allowed by the traction battery in the pulse charging mode and judge whether the traction battery matches the charging pile. And the battery management system can receive the first charging parameter of the charging pile in the pulse charging mode and judge whether the charging pile matches the traction battery. Through the mutually determined matching between the charging pile and the battery management system, the charging safety is ensured.

In some possible implementations, the method further includes: sending a first message to the charging pile regularly, the first message being used for indicating that the traction battery is normal.

In some possible implementations, the first message includes a battery charging state message, the battery charging state message being used for carrying the battery charging state of the traction battery in the pulse charging mode, and the battery charging state including at least one of following state value: a pulse charging current measurement value, a pulse charging voltage measurement value, a pulse measurement direction, and a pulse frequency measurement value.

In some possible implementations, the method further includes: receiving a second message sent by the charging pile regularly, the second message being used for indicating that the charging pile is normal.

In some possible implementations, the second message includes a charging pile charging state message, the charging pile charging state message being used for carrying a charging pile charging state of the charging pile in the pulse charging mode, and the charging pile charging state including at least one of following state values: a pulse charging current output value, a pulse charging voltage output value, a pulse direction, and a pulse frequency output value.

Through the technical solution of the embodiment of the present application, in the process of charging the traction battery by the charging pile, the charging pile can receive a first message for indicating that the traction battery is normal, and the battery management system can receive a second message for indicating that the charging pile is normal. Through a state information interaction between the charging pile and the battery management system, the charging safety can be further ensured.

In some possible implementations, the sending first charging mode demand information to a charging pile when the battery temperature is lower than a first preset threshold includes: sending a charging inhibition message to the charging pile when the battery temperature is lower than the first preset threshold; and sending the first charging mode demand information to the charging pile; where the charging inhibition message is used for indicating that the charging pile stops outputting power to the traction battery.

Through the technical solution of the embodiment of the present application, when the charging mode of the charging pile is switched, for example, before the battery management system sends the first charging mode demand information to the charging pile, the charging pile is in the direct current charging mode and is outputting the direct current to the traction battery. Currently, the battery management system first sends a charging prohibition message to the charging pile, and then sends the first charging mode demand information to the charging pile, which is beneficial to improving the conversion efficiency of the charging mode of the charging pile and improving the charging safety.

In a second aspect, a charging method is provided, which includes: receiving first charging mode demand information sent by a battery management system of a traction battery, where the first charging mode demand information is used for indicating a pulse charging mode, and the first charging mode demand information is information sent by the battery management system when a battery temperature of the traction battery is lower than a first preset threshold; and charging the traction battery using a pulsed voltage or a pulsed current in the pulse charging mode.

In some possible implementations, the method further includes: receiving second charging mode demand information sent by the battery management system, the second charging mode demand information being used for indicating a direct current charging mode, and the second charging mode demand information being information sent by the battery management system when the battery temperature of the traction battery is not lower than the first preset threshold; and charging the traction battery using the direct current charging mode, the direct current charging mode being a charging mode using a constant voltage or a constant current.

In some possible implementations, the first charging mode demand information is information sent by the battery management system according to the battery temperature of the traction battery being lower than the first preset threshold and the battery voltage of the traction battery being lower than a second preset threshold.

In some possible implementations, the second charging mode demand information is information sent by the battery management system according to the battery temperature of the traction battery being not lower than the first preset threshold or a battery voltage of the traction battery being not lower than the second preset threshold.

In some possible implementations, the first charging mode demand information includes at least one of following information: pulse current demand information, pulse voltage demand information, pulse direction demand information, pulse frequency demand information, and pulse time demand information, and the first charging mode demand information is determined according to the battery temperature and a state-of-charge of the traction battery.

In some possible implementations, before the receiving first charging mode demand information sent by a battery management system of a traction battery, the method further includes: sending an output capability message to the battery management system, the output capability message being used for carrying a first charging parameter of the charging pile in the pulse charging mode, where the first charging parameter is used for judging whether the charging pile matches the traction battery.

In some possible implementations, the first charging parameter includes at least one of following parameters: a minimum pulse charging current, a minimum pulse charging voltage, a minimum pulse charging frequency, a maximum pulse charging current, a maximum pulse charging voltage, a maximum pulse charging frequency, and a pulse waveform that can be output.

In some possible implementations, before the receiving first charging mode demand information sent by a battery management system of a traction battery, the method further includes: receiving a charging parameter message sent by the battery management system, the charging parameter message being used for carrying a second charging parameter allowed by the traction battery in the pulse charging mode; and confirming that the traction battery matches the charging pile according to the second charging parameter.

In some possible implementations, the second charging parameter includes at least one of following parameters: a maximum allowable pulse charging current, a maximum allowable pulse charging voltage, and a maximum allowable pulse charging frequency.

In some possible implementations, the method further includes: receiving a first message sent by the battery management system regularly, the first message being used for indicating that the traction battery is normal.

In some possible implementations, the first message includes a battery charging state message, the battery charging state message being used for carrying the battery charging state of the traction battery in the pulse charging mode, and the battery charging state including at least one of state values: a pulse charging current measurement value, a pulse charging voltage measurement value, a pulse measurement direction, and a pulse frequency measurement value.

In some possible implementations, the method further includes: sending a second message to the battery management system regularly, the second message being used for indicating that the charging pile is normal.

In some possible implementations, the second message includes a charging pile charging state message, the charging pile charging state message being used for carrying a charging pile charging state of the charging pile in the pulse charging mode, and the charging pile charging state including at least one of state values: a pulse charging current output value, a pulse charging voltage output value, a pulse direction, and a pulse frequency output value.

In some possible implementations, before the receiving first charging mode demand information sent by a battery management system of a traction battery, the method further includes: receiving a charging inhibition message sent by the battery management system, the charging inhibition message being used for indicating stopping outputting power to the traction battery, and the charging inhibition message being information sent by the battery management system when the battery temperature of the traction battery is lower than the first preset threshold.

In a third aspect, a battery management system of a traction battery is provided, which includes a receiving unit, configured to acquire a state parameter of the traction battery, the state parameter including a battery temperature; and a sending unit, configured to send first charging mode demand information to a charging pile when the battery temperature is lower than a first preset threshold, where the first charging mode demand information is used for indicating a pulse charging mode, the pulse charging mode is a charging mode using a pulsed voltage or a pulsed current, and the pulsed voltage or the pulsed current is used for charging the traction battery.

In a fourth aspect, a charging pile is provided, which includes: a receiving unit, configured to receive first charging mode demand information sent by a battery management system of a traction battery, the first charging mode demand information being used for indicating a pulse charging mode, and the first charging mode demand information being information sent by the battery management system when a battery temperature of the traction battery is lower than a first preset threshold; and a processing unit, configured to charge the traction battery using a pulsed voltage or a pulsed current in the pulse charging mode.

In a fifth aspect, a battery management system of a traction battery is provided, which includes: a processor and a memory, the memory configured to store a computer program, and the processor configured to call the computer program to execute the method as in the first aspect and any possible implementation of the first aspect described above.

In a sixth aspect, a charging pile is provided, which includes: a processor and a memory, the memory configured to store a computer program, and the processor configured to call the computer program to execute the method as in the second aspect and any possible implementation of the second aspect.

In a seventh aspect, a computer-readable storage medium is provided, which is configured to store a computer program, where the computer program is configured to execute the method as in the first aspect and any possible implementation of the first aspect described above is provided.

In an eighth aspect, a computer-readable storage medium is provided, which is configured to store a computer program, where the computer program is configured to execute the method as in the second aspect and any possible implementation of the second aspect described above is provided.

BRIEF DESCRIPTION OF THE DRAWINGS

In order to explain the technical solution of the embodiments of the present application more clearly, the drawings required for use in the embodiments of the present application will be briefly described below, and it will be apparent that the drawings described below are only some embodi

DETAILED DESCRIPTION OF THE EMBODIMENTS

Figure 1:
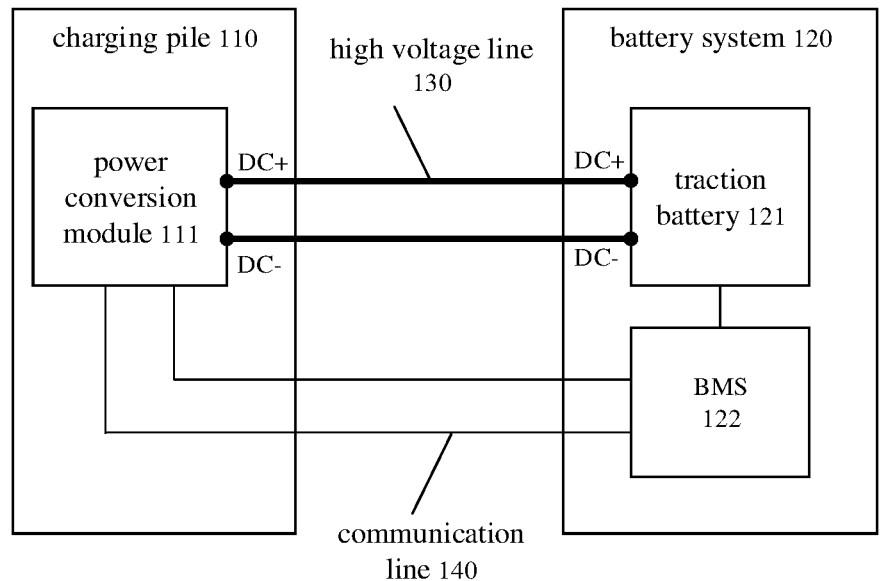
- FIG. 1 is a schematic diagram of a charging system disclosed in an embodiment of the present application.

Implementations of the present application are described in further detail below in conjunction with the accompanying drawings and embodiments. The following detailed description of the embodiments and the accompanying drawings are used to illustrate the principles of the present application, but are not intended to limit the scope of the present application, i.e., the present application is not limited to the described embodiments.

In the description of this application, it should be noted that, unless otherwise indicated, "a plurality of" means more than two; the terms "up", "down", "left", "right", "inside", "outside" and the like indicate orientations or positional relationships for ease of description and simplification of the description only, and are not intended to indicate or imply that the device or element in question must have a particular orientation, be constructed and operated in a particular orientation and therefore cannot be construed as limiting to the present application. Furthermore, the terms "first", "second", "third", etc. are used for descriptive purposes only and cannot be understood to indicate or imply relative importance. "Vertical" is not vertical in the strict sense, but within the allowable range of errors. "Parallel" is not parallel in the strict sense, but within the allowable range of errors.

The locative words appearing in the following description are all directions shown in the figure and are not intended to limit the specific structure of the present application. In the description of this application, it should also be noted that unless expressly specified and defined otherwise, the terms "mounted", "linked" and "connected" are understood in a broad sense, for example, it can be a fixed connection or a detachable connection, or being integrally connected; it can be being directly connected or connected through an intermediate medium. The specific meanings of the above terms in the present application will be understood by those of ordinary skill in the art depending on specific circumstances.

In the field of new energy, as the main power source of electrical devices, such as electrical vehicles, ships or spacecraft, the importance of traction batteries is self-evident. Where the temperature of traction battery has great influence on its performance, life, and safety. At present, most of the traction batteries in the market are rechargeable batteries, and the common ones are lithium-ion batteries or lithium-ion polymer batteries. At low temperatures, lithium-ion batteries will experience increased internal resistance and reduced capacity, and extreme conditions will lead to electrolyte freezing and battery failure to discharge, which will greatly affect the low-temperature performance of the battery system, resulting in reduced power output and range of electric vehicles. Furthermore, direct current charging of lithium-ion batteries at low temperatures will cause phenomenon of lithium deposition. Lithium deposition not only degrades the performance of lithium batteries, greatly shortens the cycle life, but also limits the fast charging capacity of batteries, and may cause disastrous consequences such as combustion and explosion.

In order to solve the problem of charging electric vehicles in low temperature environment, most of the traction batteries of electric vehicles in the market are equipped with a thermal management system. When the temperature of the traction battery is too low, the thermal management system can convert a part of electric energy into heat energy, thereby heating the whole battery pack. This preheating method can make the traction battery at a more suitable temperature, based on this, the traction battery is charged. However, this preheating method is to charge the traction battery after the temperature of the traction battery is increased. The space for increasing the heating efficiency of the traction battery is limited, and the heating time cannot be saved, which makes it impossible to fundamentally solve the problem that the charging time of electric vehicles is too long in a low-temperature environment. In addition, the configuration of thermal management system in the traction battery will not only increase the weight of the traction battery, but also increase the cost of the traction battery.

In view of this, compared with the prior art, the present application provides a new charging system and a charging method thereof, which can solve the above charging problem of the electric vehicle in the low-temperature environment without using a thermal management system to preheat the traction battery.

FIG. 1 illustrates a charging system to which embodiments of the present application apply. The charging system can be applied to various types of electrical devices including but not limited to electric vehicles and the like.

As shown in FIG. 1, a charging system 100 may include a charging pile 110 and a battery system 120. Optionally, the battery system 120 may be a battery system in an electric vehicle (including a pure electric vehicle and a pluggable hybrid electric vehicle).

Specifically, the charging pile 110 is a device for supplementing electric energy for a battery system 120 in an electric vehicle, which can be divided into two categories: an alternative current charging pile and a direct current charging pile. Where the direct current charging pile directly charges the traction battery of the electric vehicle by outputting adjustable direct current power, and the output voltage and current adjustment range are large, which can meet the demand of rapid charging. The alternative current charging pile only provides power output, but has no charging function. The subsequent rectification and direct current—direct current (DC—DC) conversion are completed by an on-board charger, and the charging pile serves as a power controller. In the embodiment of the present application below, the charging method of the present application is explained by using the charging pile as the direct current charging pile as an example, and the relevant charging method of the on-board charger can refer to the relevant description of the embodiments below.

Specifically, at least one battery pack may be provided in the battery system 120 to provide energy and power for the electric vehicle, and the at least one battery pack may be collectively referred to as a traction battery 121. In terms of the type of battery, the traction battery 121 may be a lithium-ion battery, a lithium-metal battery, a lead-acid battery, a nickel-cadmium battery, a nickel-hydrogen battery, a lithium-sulfur battery, a lithium-air battery, a sodium-ion battery, and the like, which are not specifically limited in the embodiment of the present application. In terms of battery scale, the traction battery 121 in the embodiment of the present application may be a cell/battery cell, may also be a battery module or a battery pack, which is not specifically limited in the embodiment of the present application.

In addition, in order to intelligently manage and maintain the traction battery 121, prevent over-charging and over-discharging of the battery, and prolong the service life of the battery, the battery system 120 is generally provided with a battery management system (BMS) 122 for monitoring the state of the traction battery 121. Optionally, the BMS 122 may be integrated with the traction battery 121 in the same device/apparatus, or the BMS 122 may be disposed outside the traction battery 121 as an independent device/apparatus.

Compared with the prior art, in the charging system of the present application, the charging pile 110 is additionally provided with a power conversion module 111, which can be electrically connected with the battery system 120 of the electric vehicle. Specifically, the power conversion module 111 can be electrically connected with the traction battery 121 in the battery system 120, and is used for supplying other types of electric power to the traction battery 121 in addition to direct current.

Specifically, in the present application, the power conversion module 111 is integrated in the charging pile 110, and can convert first electric energy of a first power type of the charging pile 110 into second electric energy of a second power type different from the first power type, and then send the second electric energy to the traction battery 121 of the electric vehicle, to realize power conversion. As an example, the first electric energy of the first power type is the direct current, the direct current can be a constant voltage direct current or a constant current direct current, and the power conversion module 111 can convert the direct current into a second electric energy of other power types such as voltage change, current change, power state change, current, voltage, power timing change, etc., and then send the second electric energy to the traction battery 121 of the electric vehicle, to charge the traction battery 121.

As an example, the power conversion module 111 may include a pulse generating circuit for generating pulse electricity to be supplied to the traction battery 121, and further, the power conversion module 111 may include a driving circuit, a communication circuit, a processing circuit, and other functional circuits. The embodiments of the present application do not limit the specific circuit configuration thereof. As shown in FIG. 1, the power conversion module 111 is connected with the traction battery 121 through a high voltage line 130, to output the converted electric power to the traction battery 121 to charge the traction battery 121. As an example, as shown in FIG. 1, the power conversion module 111 is connected with a positive output port (e.g., direct current positive output port DC+) and a negative output port (e.g., direct current negative output port DC−) of the traction battery 121 through the high voltage line 130.

Further referring to FIG. 1, the charging pile 110 and the BMS 122 may exchange information between them via a communication line 140. Specifically, the BMS 122 is connected to the power conversion module 111 in the charging pile 110 through the communication line 140, to realize information interaction with the power conversion module 111, and to control the running state of the power conversion module 111 to realize power conversion. In addition, the BMS 122 is connected with the traction battery 121 through the communication line 140 to exchange information with the traction battery 121 and acquire the relevant state of the traction battery 121.

By way of example, the communication line 140 includes, but is not limited to, a control area network (CAN) communication bus or a daisy chain communication bus. Optionally, the communication between the charging pile 110 and the BMS 122 may be based on the relevant protocol provisions of the communication physical layer, the data link layer, and the present application layer of the CAN communication protocol or the daisy chain communication protocol.

Specifically, in the conventional charging system on the market, the charging pile and the BMS directly carry out information interaction through a communication protocol. In the embodiments of the present application, the power conversion between the charging pile and the BMS can be realized under the condition that the communication protocol of the charging pile and the BMS is compatible with the current charging pile and BMS.

Figure 2:
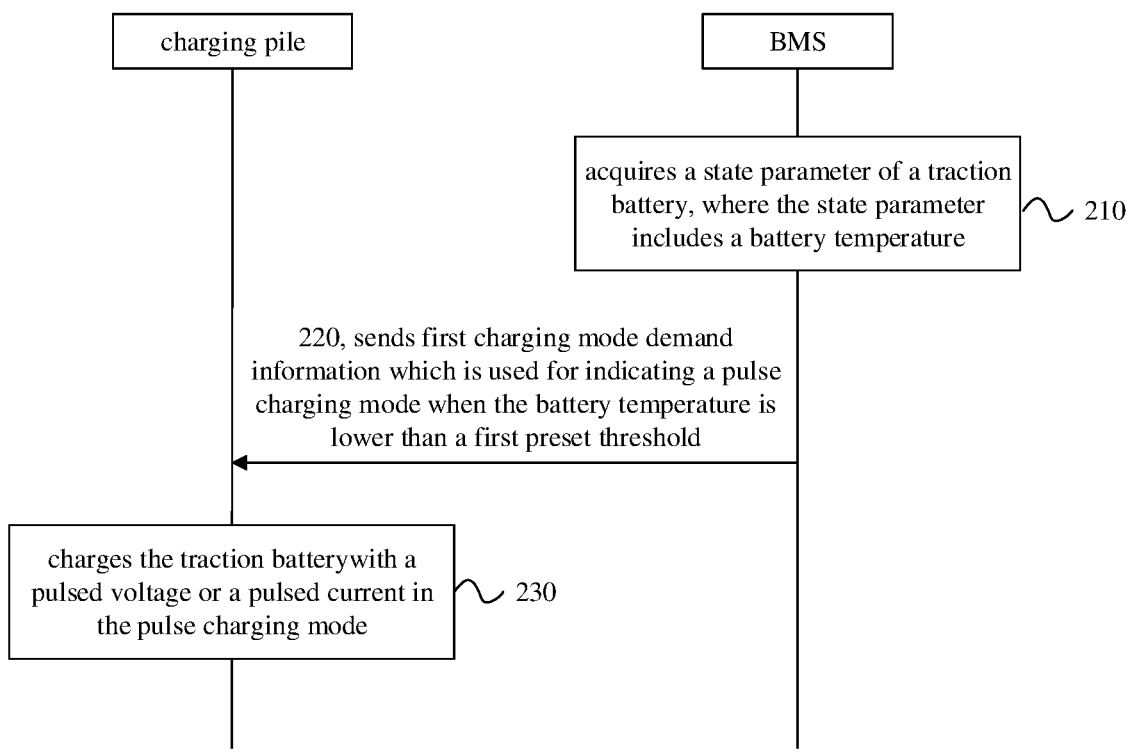
FIG. 2 is a schematic flow diagram of a charging method disclosed in an embodiment of the present application.

FIG. 2 is a schematic flow chart of a charging method 200 provided by an embodiment of the present application. Optionally, the method 200 can be applied to the charging system shown in FIG. 1 above.

As shown in FIG. 2, the charging method 200 may include the following steps.

Step 210: a battery management system (BMS) acquires a state parameter of a traction battery, where the state parameter includes a battery temperature.

Step 220: the BMS sends first charging mode demand information to a charging pile when the battery temperature is lower than a first preset threshold, where the first charging mode demand information is used for indicating a pulse charging mode.

Step 230: the charging pile charges the traction battery with a pulsed voltage or a pulsed current in the pulse charging mode.

Optionally, in the embodiments of the present application, the traction battery may be the traction battery shown above in FIG. 1, the traction battery generally includes at least one battery pack, each battery pack may include a plurality of battery cells in series and parallel connection. The battery temperature of the traction battery includes, but is not limited to, the temperature of each battery cell. In the related art, the battery cell may also be referred to as a cell.

After BMS acquires the battery temperature of the traction battery, when the battery temperature is lower than the first preset threshold, the BMS sends the first charging mode demand information to the charging pile. Optionally, the first preset threshold may be a preset arbitrary value, which intends to indicate that the traction battery is in a low-temperature state. The first preset threshold can be correspondingly set according to the geographical position of the traction battery, the battery type, attribute parameters, the system architecture of the traction battery and other related factors, and the embodiments of the present application do not limit the specific value thereof. As an example, the first preset threshold may be any value below 10 degree centigrade (° C.), for example, the first preset threshold may be 5° C.

Optionally, the first charging mode demand information may be the charging mode demand information defined by the communication protocol between the BMS and the charging pile, and the embodiments of the present application do not specifically limit to the first charging mode demand information. As an example, the first charging mode demand information includes at least one identification bit for indicating other charging modes that are different from the direct current charging mode, and the other charging mode include, but not limited to, the pulse charging mode.

In some embodiments, information interaction is carried out between BMS and charging pile through CAN communication protocol. The first charging mode demand information is not the mode information in the battery charging lab (BCL) message sent by the charging pile to the BMS in the prior art. The charging mode information in the BCL message is only used to indicate a constant voltage charging mode or a constant current charging mode, and the first charging mode demand information may be information in an additional battery pulse charging demand message, the battery pulse charging demand message may be used to indicate other charging modes such as a pulse charging mode.

With the CAN communication protocol, as an example, the first charging mode demand information may be used only to indicate the pulse charging mode. As another example, the first charging mode demand information may directly include pulse electricity information in the pulse charging mode, the pulse electricity information including at least one of following information: pulse current demand information, pulse voltage demand information, pulse direction demand information, and pulse frequency demand information.

For example, the first charging mode demand information in the battery pulse charge demand message may include at least one of the information in Table 1 below.

TABLE 1

| Serial number | Content | Length | Option |
|---|---|---|---|
| 1 | Pulse voltage peak demand value | 2 bytes | |
| 2 | Pulse current effective demandvalue | 2 bytes | Unit: A<br>Resolution: 0.1 A/bit<br>Range: −2000 A to 2000 A<br>Offset: −2000 A |
| 3 | Pulse current peak demand value | 2 bytes | Unit: A<br>Resolution: 0.1 A/bit<br>Range: −2000 A to 2000 A<br>Offset: 2000A |
| 4 | Pulse direction demand | 1 byte | 1: Positive; 2: Negative;<br>3: Bidirectional (positive and negative);<br>Other invalid |
| 5 | Pulse frequency demand value | 2 bytes | Unit: Hz<br>Resolution: 1 Hz/bit<br>Range: 0 to 10000 Hz<br>Offset: 0 |

It should be noted that the byte length and other relevant information in the message of each demand information in the above table are illustrated as examples only, and should not limit the first charging mode demand information in the embodiments of the present application.

In addition to the above, the first charging mode demand information is distinguished from the BCL message as an information in the additional battery pulse charging demand message, in other embodiments, the first charging demand information may also be additional message information in the BCL message.

For example, in a BCL message, the charging mode can be used to indicate other charging modes, such as pulse charging mode, in addition to the constant voltage charging mode or the constant current charging mode.

For example, in BCL messages, voltage requirements can be used to indicate pulse voltage requirements in addition to direct current voltage requirements, and current requirements can also be used to indicate pulse current requirements in addition to direct current requirements.

For another example, the BCL message may include at least one of the information in Table 1 above in addition to the three items of information in the prior art.

Combined with the above description of the first charging mode demand information, if the first charging mode demand information is only used to indicate the pulse charging mode, after receiving the first charging mode demand information, the charging pile can send response information to the BMS. After receiving the response information, the BMS can further send pulse electricity information to the charging pile. Where if the charging pile supports the pulse charging mode, the charging pile sends a response message to the BMS, and if the charging pile does not support the pulse charging mode, the response message is not sent. By adopting the embodiment, it is possible to detect whether the charging pile satisfies the condition of the pulse charging mode by means of the first charging mode demand information, and to enter the pulse charging mode on the basis that the charging pile supports the pulse charging mode, which can improve the reliability and safety of the charging process.

If the first charging mode demand information directly includes pulse electricity demand information in the pulse charging mode, and on the basis that the charging pile supports the pulse charging mode, the charging pile may directly and quickly enter the pulse charging mode. In the pulse charging mode, the charging pile directly outputs a pulsed voltage or a pulsed current to the traction battery according to the pulse power demand information in the first charging mode demand information, so as to improve the charging efficiency and the charging speed.

To sum up, through the technical solution of the embodiment of the present application, the BMS acquires a battery temperature of the traction battery, when the battery temperature is low, for example, when it is lower than a first preset threshold, first charging mode demand information indicating a pulse charging mode is sent to a charging pile, the charging pile can output pulse electricity to charge the traction battery in the pulse charging mode, so as to prevent performance of the traction battery from being affected by directly charging the traction battery at a low temperature, thereby ensuring the performance of the traction battery. In addition, through the technical solution of the embodiment of the application, the traction battery does not need to be configured with a thermal management system, and on the basis of reducing the overall cost of the traction battery, the heating time of the traction battery at a low temperature is saved, and the charging efficiency is improved.

Optionally, in the above embodiment, the BMS may determine the above pulse electricity information according to the state parameter of the traction battery. Optionally, the state parameters of the traction battery may include, in addition to the battery temperature, other state parameters of the traction battery. The other state parameter information includes, but is not limited to, related parameters such as battery voltage, battery current, state of charge (SOC) of the battery, estimated remaining charge time, etc. Where SOC can be regarded as a thermodynamic quantity to evaluate the potential electric energy of the battery.

In some embodiments, the BMS may determine the above pulse electricity information according to the battery temperature and the SOC of the traction battery, such that the pulse electricity generated from the pulse electricity information can be adapted to both the current temperature of the traction battery and the SOC of the traction battery.

Optionally, determining the pulse electricity information according to the battery temperature and SOC may be implemented in a variety of ways. As an example, the mapping relationship of battery temperature, SOC and pulse charging information can be determined, and specific pulse electricity information can be determined according to the mapping relationship, where the mapping relationship can be a mapping relationship obtained by fitting a large number of experimental data, and the mapping relationship has high reliability and accuracy. The mapping relationship can be a mapping table, a mapping diagram or a mapping formula, etc. In addition, in other examples, a special neural network model can be trained according to a large number of experimental data, and the neural network model can output pulse charging information according to the input battery temperature and SOC.

Optionally, in step 220 above, as another embodiment, when the battery temperature is lower than the first preset threshold, the BMS sends first charging mode demand information to the charging pile after sending a charging inhibition message to the charging pile, where the charging inhibition message is used for indicating the charging pile to stop outputting power to the traction battery.

Through the technical solution of the embodiments of the present application, when the charging mode of the charging pile is switched, for example, before the BMS sends the first charging mode demand information to the charging pile, the charging pile is in the direct current charging mode and is outputting the direct current to the traction battery. At this time, the BMS first sends a charging prohibition message to the charging pile, and then sends the first charging mode demand information to the charging pile, which is beneficial to improving the conversion efficiency of the charging mode of the charging pile and improving the charging safety.

Figure 3:
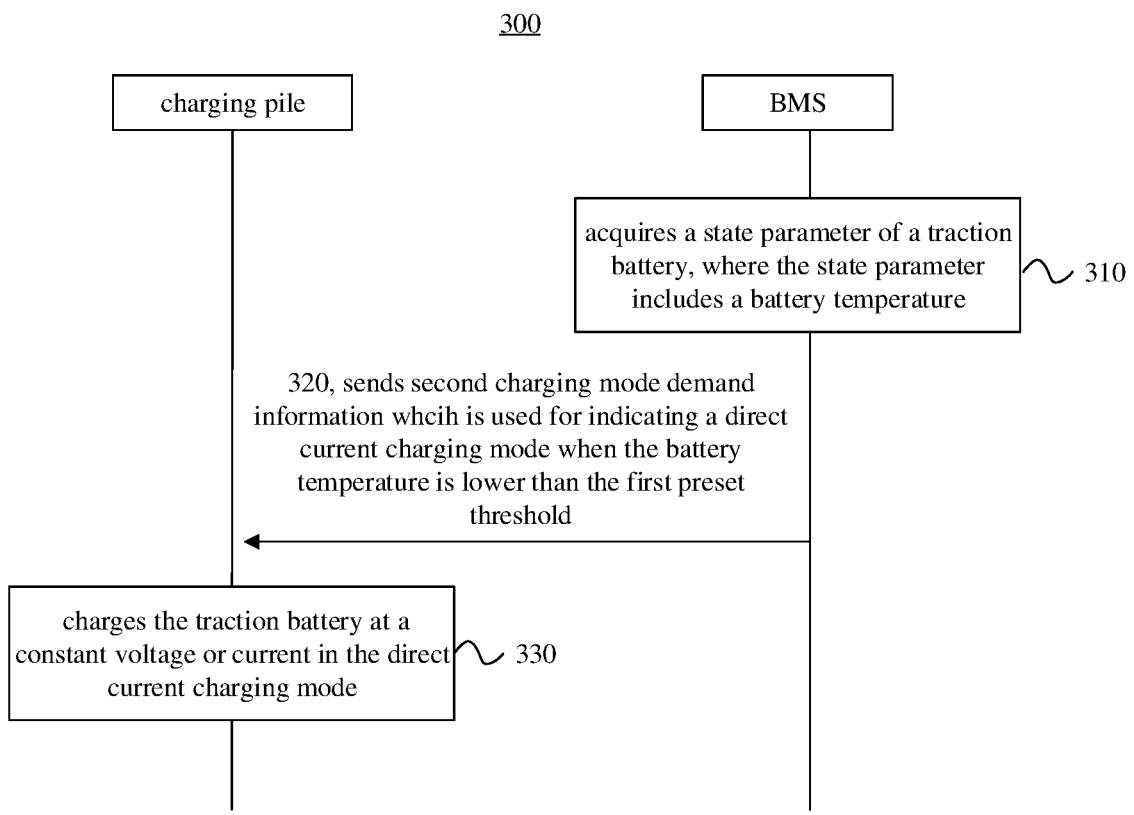
FIG. 3 is a schematic flow diagram of a charging method disclosed in another embodiment of the present application.

FIG. 3 is a schematic flow chart of another charging method 300 provided by an embodiment of the present application.

As shown in FIG. 3, the charging method 300 may include the following steps.

Step 310: the BMS acquires a state parameter of a traction battery, where the state parameter includes a battery temperature.

Step 320: the BMS sends second charging mode demand information to the charging pile when the battery temperature is lower than the first preset threshold, where the second charging mode demand information is used for indicating a direct current charging mode.

Step 330: the charging pile charges the traction battery at a constant voltage or current in the direct current charging mode.

Optionally, in embodiments of the present application, after the BMS acquires the battery temperature of the traction battery, when the battery temperature is not lower than the first preset threshold, it is indicated that the current traction battery is in a non-low temperature state, and the BMS sends the second charging mode demand information to the charging pile for indicating the direct current charging mode. Specifically, the related technical solutions of the first preset threshold can refer to the specific description of the above embodiment, and will not be repeated here.

Optionally, the second charging mode demand information may be charging mode demand information defined by a communication protocol between the BMS and the charging pile. As an example, the second charging mode demand information includes at least one identification bit for indicating a direct current charging mode.

In some embodiments, information interaction is carried out between BMS and charging pile through CAN communication protocol. The second charging mode demand information can be information in a battery charging lab (BCL) message sent by the charging pile to the BMS in the prior art. The charging mode (constant voltage charging mode or constant current charging mode) in the BCL message is used for indicating a direct current charging mode. Certainly, in other embodiments, the second charging mode demand information may also be information in an additional battery charging demand message, which may be used to indicate a charging mode such as a direct current charging mode, a pulse charging mode, etc.

It is understandable that, if the second charging mode demand information is the information in the BCL message sent by the charging pile to the BMS in the prior art, in the direct current charging mode, the charging pile outputs direct current to the traction battery according to the information in the BCL message, and the process of charging the traction battery can refer to the related solution of the prior art, which will not be repeated here.

It is also understandable that, the technical solution of the embodiments of the present application may occur before or after the technical solution of the embodiment of the method 200 above. In other words, the BMS may regularly acquire the state parameters of the traction battery and send first charging mode demand information or second charging mode demand information to the charging pile according to the current battery temperature of the traction battery.

Through the technical solution of the embodiment of the present application, the BMS can continuously acquire the battery temperature of the traction battery, when the traction battery is in a non-low temperature state, for example, when the temperature is not lower than the first preset threshold, second charging mode demand information indicating a direct current charging mode is sent to the charging pile. The charging pile can output direct current to charge the traction battery in the direct current charging mode, and the charging efficiency of the traction battery in the non-low temperature is improved. Therefore, through the technical solution of the embodiment of the present application, the BMS can flexibly send different charging mode demand information to the charging pile according to the battery temperature of the traction battery, and the charging efficiency of the whole charging process is improved on the premise of ensuring the performance of the traction battery.

Optionally, in step 320 above, as another embodiment, when the battery temperature is not lower than the first preset threshold, the BMS sends second charging mode demand information to the charging pile after sending a charging inhibition message to the charging pile, where the charging inhibition message is used for indicating the charging pile to stop outputting power to the traction battery.

Through the technical solution of the embodiments of the present application, when the charging mode of the charging pile is switched, for example, before the BMS sends the second charging mode demand information to the charging pile, the charging pile is in the pulse charging mode and is outputting the pulse electricity to the traction battery. At this time, the BMS first sends a charging prohibition message to the charging pile, and then sends the second charging mode demand information to the charging pile, which is beneficial to improving the conversion efficiency of the charging mode of the charging pile and improving the charging safety.

Figure 4:
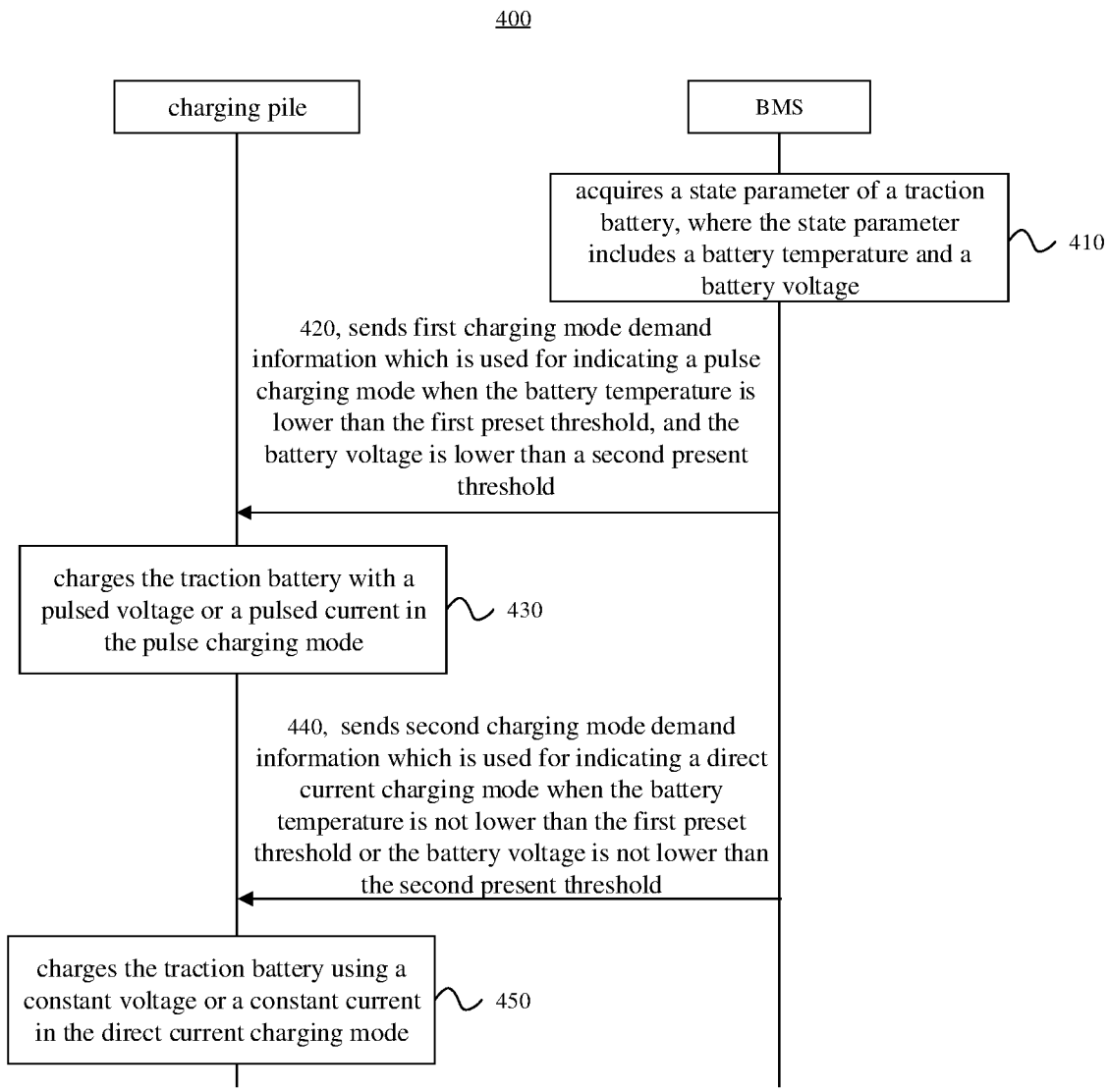
FIG. 4 is a schematic flow diagram of a charging method disclosed in another embodiment of the present application.

FIG. 4 is a schematic flow chart of another charging method 400 provided by an embodiment of the present application.

As shown in FIG. 4, the charging method 400 may include the following steps.

Step 410: the battery management system (BMS) acquires a state parameter of a traction battery, where the state parameter includes a battery temperature and a battery voltage.

Step 420: the BMS sends first charging mode demand information to the charging pile when the battery temperature is lower than the first preset threshold, and the battery voltage is lower than a second present threshold, where the first charging mode demand information is used for indicating a pulse charging mode.

Step 430: the charging pile charges the traction battery with a pulsed voltage or a pulsed current in the pulse charging mode.

Step 440: the BMS sends second charging mode demand information to the charging pile when the battery temperature is not lower than the first preset threshold, or the battery voltage is not lower than the second present threshold, where the second charging mode demand information is used for indicating a direct current charging mode.

Step 450: the charging pile charges the traction battery using a constant voltage or a constant current in the direct current charging mode.

In an embodiment of the present application, the BMS acquires the battery voltage of the traction battery in addition to the battery temperature of the traction battery.

Specifically, in the charging and discharging process of the traction battery, besides the battery temperature has a great influence on it, detecting its voltage at the same time can better reflect the current charging and discharging state of the traction battery, and prevent it from over-charging or over-discharging and causing permanent damage to the traction battery. Therefore, in the embodiments of the present application, the BMS acquires the battery voltage of the traction battery in addition to the battery temperature of the traction battery, and judges the charging mode of the traction battery by synthesizing various information, which improves the charging safety performance Specifically, the battery voltage of the traction battery includes, but is not limited to, the voltage of each battery cell in the traction battery and/or the total voltage of the entire traction battery.

When the battery temperature is lower than the first preset threshold and the battery voltage is lower than the second preset threshold, it is indicated that the current traction battery is in a low temperature state and the current traction battery is in a low voltage pending charging state, the BMS sends first charging mode demand information to the charging pile, and the first charging mode demand information is used for indicating the pulse charging mode. Optionally, the second preset threshold may be any preset value intended to indicate that the traction battery is in a low voltage pending charging state, and the second preset threshold may be set to different values according to different traction battery types and configurations, which are not specifically limited by the embodiments of the present application.

Correspondingly, when the battery temperature is not lower than the first preset threshold or the battery voltage is not lower than the second preset threshold, it is indicated that the current traction battery is in a non-low temperature state, or the current traction battery is not in a pending charging state or in a high voltage pending charging state, the BMS sends the second charging mode demand information to the charging pile, and the second charging mode demand information is used for indicating the direct current charging mode.

Optionally, the related technical solutions in the embodiments of the present application can be referred to above in the related description of FIG. 2 and FIG. 3 and will not be repeated here.

In the technical solution of the embodiment of the present application, the BMS not only acquires the battery temperature of the traction battery, but also acquires the battery voltage of the traction battery, and judges the charging mode of the traction battery by integrating the information of both the battery temperature and the battery voltage. When the traction battery is in a low temperature state and in a low voltage pending charging state, the charging pile outputs pulse electricity to charge the traction battery, thereby further ensuring the charging safety, and in the non-low temperature or when the traction battery is in a high voltage state, the charging pile outputs direct current to charge the traction battery, thereby improving the charging efficiency.

In the above embodiments, the related technical solutions of the BMS and charging pile in charging stage are explained. Optionally, in the embodiments of the present application, before the charging stage, the BMS and the charging pile also have a parameter configuration stage. In the parameter configuration stage, the BMS and/or the charging pile are configured to receive each other's charging parameters. On the premise that the charging parameters of the BMS and the charging pile match, they enter the subsequent charging stage. Through the parameter configuration stage, the charging safety and effectiveness can be improved.

Figure 5:
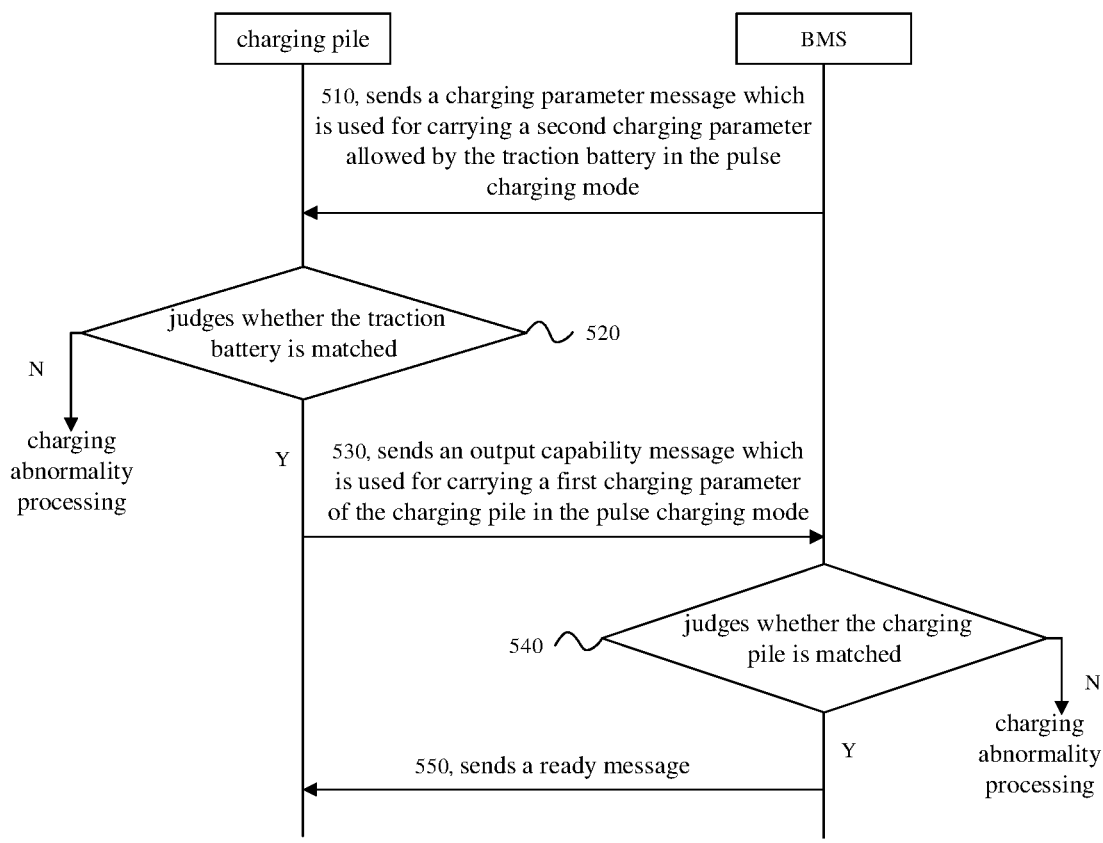
FIG. 5 is a schematic flow diagram of a charging method disclosed in another embodiment of the present application.

FIG. 5 is a schematic flow chart of another charging method 500 provided by an embodiment of the present application.

As shown in FIG. 5, the charging method 500 may include the following steps.

Step 510: the BMS sends a charging parameter message to the charging pile, where the charging parameter message is used for carrying a second charging parameter allowed by the traction battery in the pulse charging mode.

Step 520: the charging pile judges whether the traction battery matches the charging pile.

Step 530: if matched, the charging pile sends an output capability message to the BMS, where the output capability message is used for carrying a first charging parameter of the charging pile in the pulse charging mode.

Step 540: the BMS judges whether the charging pile matches the traction battery.

Step 550: if matched, the BMS sends a ready message to the charging pile.

Specifically, the charging method 500 for the parameter configuration stage of the embodiment of the present application is executed prior to the above methods 200 to 400.

Specifically, in step 510, the charging parameter message sent by the BMS to the charging pile carries the second charging parameter allowed by the traction batter in the pulse charging mode. As an example, if information interaction is carried out between BMS and charging pile through CAN communication protocol, in some embodiments, the charging parameter message for carrying the second charging parameter may be different from a battery charging parameter (BCP) message sent to the BMS by the charging pile in the prior art, and the charging parameter message may be an additional battery pulse charging parameter message.

Optionally, the second charging parameter includes at least one of following parameters: a maximum allowable pulse charging current, a maximum allowable pulse charging voltage, and a maximum allowable pulse charging frequency.

For example, the second charging parameter in the battery pulse charging parameter message may include at least one parameter in Table 2 below.

TABLE 2

| Serial number | Content | Length | Option |
|---|---|---|---|
| 1 | Maximum allowable pulse charging voltage | 2 bytes | Unit: A<br>Resolution: 0.1 A/bit<br>Range: −2000 A to 2000 A<br>Offset: −2000 A |
| 2 | Maximum allowable pulse charging frequency | 2 bytes | Unit: V<br>Resolution: 0.1 V/bit<br>Range: 0 to 1000 V<br>Offset: 0 |
| 3 | Maximum allowable pulse charging voltage | 2 bytes | Unit: V<br>Resolution: 0.1 V/bit<br>Range: 0 to 1000 V<br>Offset: 0 |

It should be noted that the byte length and other relevant information in the message of each parameter in the above table are illustrated as examples only, and should not limit the second charging parameter in the embodiments of the present application.

In addition to the above, the second charging parameter is distinguished from the BCP message, as a parameter in an additional battery pulse charging parameter message, in other embodiments, the second charging parameter may also be an additional parameter in the BCP message.

For example, the BCP message may include at least one of the parameters in Table 2 above in addition to related parameters in the prior art.

In step 520, the charging pile receives the charging parameter message, and judges whether the traction battery matches the charging pile, or in other words, whether the traction battery is suitable for the charging pile, according to the second charging parameter in the charging parameter message. Optionally, the charging pile judges whether the charging parameter message is received within the preset time period. If the charging parameter message is not received within the preset time period, the charging pile executes a charging abnormality processing, for example, the charging pile stops charging.

Optionally, the charging pile compares the second charging parameter with the pulse electricity parameter that can be provided by the charging pile to judge whether the traction battery matches the charging pile.

As an example, if the maximum allowable charging pulse electricity parameter of the traction battery is less than the minimum pulse electricity parameter that can be provided by the charging pile, the traction battery does not match the charging pile. In other words, if the traction battery matches the charging pile, the maximum allowable charging pulse electricity parameter of the traction battery needs to be greater than the minimum pulse electricity parameter that can be provided by the charging pile.

As another example, if the maximum allowable charging pulse electricity parameter of the traction battery is less than the maximum pulse electricity parameter that can be provided by the charging pile, the charging pile may cause charging risk to the traction battery, and the traction battery does not match the charging pile. In other words, if the traction battery matches the charging pile, the maximum allowable charging pulse electricity parameter of the traction battery needs to be greater than the maximum pulse electricity parameters that can be provided by the charging pile.

As a third example, the traction battery does not match the charging pile if the type of pulse electricity required by the traction battery is not the type of pulse electricity that can be provided by the charging pile. In other words, if the traction battery matches the charging pile, the type of pulse electricity required by the traction battery needs to be the type of pulse electricity provided by the charging pile.

It should be noted that in the above three examples, the pulse electricity parameter that the charging pile can provide includes, but is not limited to, the pulse current, pulse voltage, pulse electricity frequency, pulse electricity type and so on that the charging pile can provide.

It should also be noted that, in addition to the illustration of the above two examples, the process of judging whether the traction battery matches the charging pile by the charging pile can also be judged by other methods in the related art, and the embodiments of the present application do not make specific limitations.

If the charging pile judges that the traction battery does not match the charging pile, the charging pile may perform charging abnormality processing, for example, the charging pile stops charging.

Optionally, after step 520, the embodiment of the present application may further execute step 530. If the charging pile judges that the traction battery matches the charging pile, the charging pile sends an output capability message to the BMS, where the output capability message is used for carrying the first charging parameter of the charging pile in the pulse charging mode.

As an example, if information interaction is carried out between BMS and charging pile through CAN communication protocol, in some embodiments, the output capability message for carrying the first charging parameter may be different from the charger maximum lab (CML) message sent by the BMS to the charging pile in the prior art, and the output capability message may be an additional battery pulse output capability message.

Optionally, the first charging parameter includes at least one of following parameters: a minimum pulse charging current, a minimum pulse charging voltage, a minimum pulse charging frequency, a maximum pulse charging current, a maximum pulse charging voltage, a maximum pulse charging frequency, and a pulse waveform that can be output.

For example, the first charging parameter in the battery pulse output capability message may include at least one parameter in Table 3 below.

TABLE 3

| Serial number | Content | Length | Option |
|---|---|---|---|
| 1 | Maximum pulse charging voltage | 2 bytes | |
| 2 | Minimum pulse charging voltage | 2 bytes | |

TABLE 3-continued

| Serial number | Content | Length | Option |
|---|---|---|---|
| 3 | Maximum pulse charging current | 2 bytes | Unit: A<br>Resolution: 0.1 A/bit<br>Range: −2000 A to 2000 A<br>Offset: −2000 A |
| 4 | Minimum pulse charging current | 2 bytes | Unit: A<br>Resolution: 0.1 A/bit<br>Range: −2000 A to 2000 A<br>Offset: −2000 A |
| 5 | Maximum pulse charging frequency | 2 bytes | Unit: Hz<br>Resolution: 1 Hz/bit<br>Range: 0 to 10000 Hz<br>Offset: 0 |
| 6 | Minimum pulse charging frequency | 2 bytes | Unit: Hz<br>Resolution: 1 Hz/bit<br>Range: 0 to 10000 Hz<br>Offset: 0 |
| 7 | Type of pulse waveform that can be output | 2 bytes | |

It should be noted that the byte length and other relevant information in the message of each parameter in the above table are illustrated as examples only, and should not limit the first charging parameter in the embodiments of the present application.

In addition to the above, the first charging parameter is distinguished from the CML message, as a parameter in an additional battery pulse output capability message, in other embodiments, the first charging parameter may also be an additional parameter in the CML message.

For example, the CML message may include at least one of the parameters in Table 3 above in addition to related parameters in the prior art.

In step 540, the BMS receives the output capability message and judges whether the charging pile matches the traction battery according to the first charging parameter in the output capability message, so as to judge whether the charging pile is suitable for the traction battery. Optionally, the BMS judges whether the output capability message is received within the preset time period, and if the output capability message is not received within the preset time period, the BMS executes the charge abnormality processing, for example, the BMS controls the traction battery to stop charging.

Optionally, the BMS compares the pulse electricity parameter allowed by the traction battery with the first charging parameter, to judge whether the charging pile is suitable for the traction battery.

Optionally, in embodiments of the present application, the pulse electricity parameter allowed by the traction battery may be the second charging parameter in the above steps 510 and 520. Specifically, the process that the BMS compares the pulse electricity parameter allowed the traction battery with the first charging parameter to judge whether the charging pile is suitable for the traction battery can be found in the relevant description in step 520 above, and which will not be repeated here.

If the BMS judges that the charging pile and the traction battery do not match, the BMS may execute charge abnormality processing, for example, the BMS controls the traction battery to stop charging.

In step 550, if the BMS judges that the charging pile matches the traction battery, the BMS sends a ready message to the charging pile, indicating that the traction battery is ready to start charging. Understandably, after the charging pile receives the ready message sent by the BMS, it can also send the charging pile ready message to the BMS according to its own state. When the traction battery and charging pile are ready, the parameter configuration stage is completed and the subsequent charging stage can be entered.

In an embodiment of the present application, as an optional implementation, the charging method 500 may include all the step 510 to step 550 described above, and the order of steps in the charging method 500 is not specifically limited in the embodiment of the present application. For example, in some embodiments, step 530 and step 540 may also occur before step 510 and step 520.

According to the technical solution of the embodiment, the charging pile can receive the second charging parameter allowed by the traction battery in the pulse charging mode and judge whether the traction battery matches the charging pile, and the BMS can receive the first charging parameter of the charging pile in the pulse charging mode and judge whether the charging pile matches the traction battery. Through the mutually determined matching between the charging pile and the BMS, the charging safety is ensured.

In other alternative embodiments, the charging method 500 may also include only some of the steps 510 to 550 described above, for example, only steps 510, 520, or only steps 530 to 550. That is, by adopting the technical solution of the embodiment, the charging pile judges whether the traction battery matches the charging pile through the second charging parameter, or the BMS judges whether the charging pile matches the traction battery through the first charging parameter. The efficiency of parameter matching is improved by determining whether the two are matched by either side of the charging pile and the BMS, thus speeding up charging.

Figure 6:
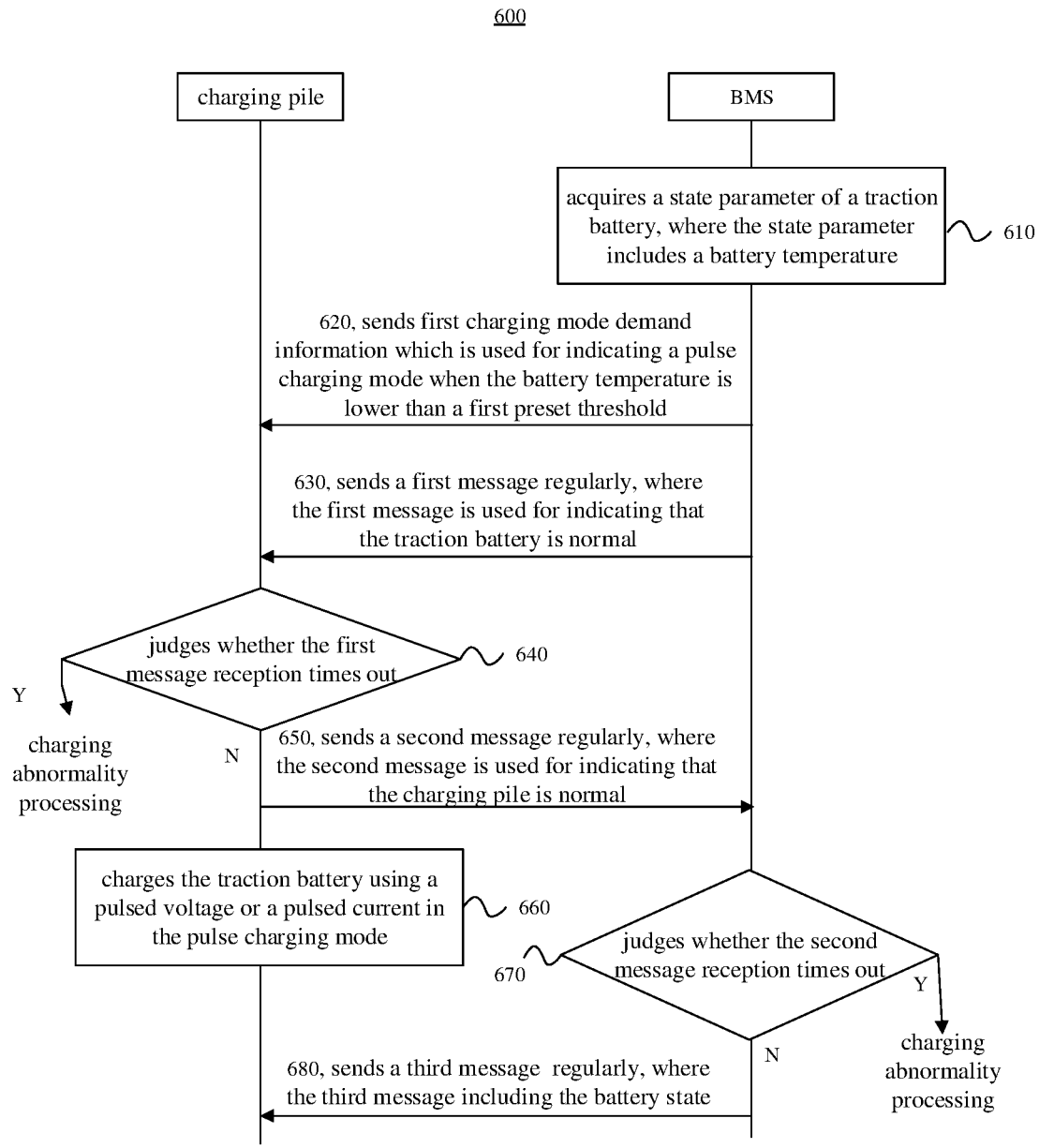
FIG. 6 is a schematic flow diagram of a charging method disclosed in another embodiment of the present application.

Further, based on the charging method 400 above, FIG. 6 illustrates a schematic flow chart of another charging method 600 provided by an embodiment of the present application.

As shown in FIG. 6, the charging method 600 may include the following steps.

Step 610: the BMS acquires a state parameter of a traction battery, where the state parameter includes a battery temperature.

Step 620: the BMS sends first charging mode demand information to the charging pile when the battery temperature is lower than the first preset threshold, where the first charging mode demand information is used for indicating a pulse charging mode.

Step 630: the BMS regularly sends a first message to the charging pile, where the first message is used for indicating that the traction battery is normal.

Step 640: the charging pile judges whether the first message reception times out.

Step 650: if the reception does not time out, the charging pile sends a second message to the BMS regularly, where the second message is used for indicating that the charging pile is normal.

Step 660: the charging pile charges the traction battery using a pulsed voltage or a pulsed current in the pulse charging mode.

Step 670: the BMS judges whether the second message reception times out.

Step 680: if the reception does not time out, the BMS sends a third message to the charging pile regularly, where the third message including the battery state.

Specifically, in the embodiments of the present application, the related technical solutions of steps 610, 620, and 660 described above can be found in the relevant descriptions in the embodiment shown in FIG. 2 above.

Optionally, in step 610, the state parameter of the traction battery acquired by the BMS may include a battery voltage in addition to the battery temperature. In this case, the related solution of steps 610, 620, and 660 may also refer to the related description in the embodiment shown in FIG. 3 above.

Optionally, in step 630, after the BMS sends the first charging mode demand information to the charging pile, the BMS also regularly sends a first message indicating that the state of the traction battery is normal to the charging pile.

In some embodiments, the first message may include a battery charging state message, where the battery charging state message is used for carrying a battery charging state measurement value of the traction battery in the pulse charging mode.

As an example, if information interaction is carried out between BMS and charging pile through CAN communication protocol, in some implementations, the battery charging state message for carrying the battery charging state measurement value of the traction battery in the pulse charging mode may be different from the battery charging state (BCS) message sent by the BMS to the charging pile in the prior art, and the battery charging state message may be an additional battery pulse charging state message.

Optionally, the battery charging state measurement value of the traction battery in the pulse charge mode may include at least one of the following measurement values: a pulse charging current measurement value, a pulse charging voltage measurement value, a pulse measurement direction, and a pulse frequency measurement value.

For example, the battery charging state measurement value of the traction battery in the pulse charge mode in the battery pulse charging state message may include at least one measurement value in Table 4 below.

TABLE 4

| Serial number | Content | Length | Option |
| --- | --- | --- | --- |
| 1 | Pulse charging voltage measurement value | 2 bytes | |
| 2 | Pulse charging current peak measurement value | 2 bytes | Unit: A<br>Resolution: 0.1 A/bit<br>Range: −2000 A to 2000 A<br>Offset: 2000 A |
| 3 | Pulse charging current effective measurement value | 2 bytes | Unit: A<br>Resolution: 0.1 A/bit<br>Range: −2000 A to 2000A<br>Offset: 2000 A |
| 4 | Pulse direction | 1 byte | 1: Positive; 2: Negative; 3: Bidirectional (positive and negative); Other invalid |
| 5 | Pulse frequency measurement value | 2 bytes | Unit: Hz<br>Resolution: 1 Hz/bit<br>Range: 0 to 10000 Hz<br>Offset: 0 |

It should be noted that the byte length and other relevant information of each measured value in the message in the above table are only illustrated as examples, and should not limit the battery charging state measurement value of the traction battery in the pulse charge mode in the embodiments of the present application.

In addition to the above, the battery charging state measurement value of the traction battery in the pulse charging mode is different from the BCS message, as an additional charging state measurement value in the battery pulse charging state message. In other embodiments, the battery charging state measurement value of the traction battery in the pulse charging mode may also be an additional measurement value in the BCS message.

For example, the BCS message may include at least one of the measurement values in Table 4 above in addition to related parameters in the prior art.

Optionally, after the BMS sends the first message to the charging pile, step 640 is executed: the charging pile judges whether the first message is received within a preset time, i.e., whether the first message reception times out. If the first message is not received within the preset time (or in other words, the reception times out), the charging pile executes the charging abnormality processing, for example, the charging pile stops charging.

If the charging pile receives the first message within the preset time (or in other words, the reception does not time out), then step 650 is executed: the charging pile regularly sends a second message indicating that the charging pile is in a normal state to the BMS.

Optionally, the second message includes, but is not limited to, a charging pile charging state message, where the charging pile charging state message is used for carrying a charging pile charging state measurement value of the charging pile in the pulse charging mode.

As an example, if information interaction is carried out between BMS and charging pile through CAN communication protocol, in some implementations, the charge pile charging state message for carrying a charge pile charging state measurement value in the pulse charging mode may be different from the charger charging state (CCS) message sent to the charge pile by the BMS in the prior art, and the battery charging state message may be an additional charger pulse charging state message.

Optionally, the charging state measurement value of the charging pile in the pulse charging mode includes at least one of the following measurement values: a pulse charging current output value, a pulse charging voltage output value, a pulse direction, and a pulse frequency output value.

For example, the charging pile charging state measurement value of the charging pile in the pulse charging mode in the charger pulse charging state message may include at least one of the measurement values in Table 5 below.

TABLE 5

| Serial number | Content | Length | Option |
| --- | --- | --- | --- |
| 1 | Pulse charging voltage output value | 2 bytes | |
| 2 | Pulse charging peak current output value | 2 bytes | Unit: A<br>Resolution: 0.1 A/bit<br>Range: −2000 A to 2000 A<br>Offset: 2000 A |
| 3 | Pulse charging effective current output value | 2 bytes | Unit: A<br>Resolution: 0.1 A/bit<br>Range: −2000 A to 2000 A<br>Offset: 2000 A |

TABLE 5-continued

| Serial number | Content | Length | Option |
|---|---|---|---|
| 4 | Pulse direction | 1 byte | 1: Positive; 2: Negative; 3: Bidirectional (positive and negative); Other invalid |
| 5 | Pulse frequency output value | 2 bytes | Unit: Hz Resolution: 1 Hz/bit Range: 0 to 10000 Hz Offset: 0 |

It should be noted that the byte length and other relevant information of each measured value in the message in the above table are only illustrated as examples, and should not limit the battery pile charging state measurement value of the charging pile in the pulse charge mode in the embodiments of the present application.

In addition to the above, the charging pile charging state measurement value of the traction battery in the pulse charging mode is different from the CCS message, as an additional charging state measurement value in the charging pile pulse charging state message. In other embodiments, the charging pile charging state measurement value of the charging pile in the pulse charging mode may also be an additional measurement value in the CCS message.

For example, the CCS message may include at least one of the measurement values in Table 5 above in addition to related parameters in the prior art.

Further, after the charging pile regularly sends the second message to the BMS, step 660 is executed: the charging pile charges the traction battery with a pulse voltage or current in the pulse charging mode, and step 670 is executed: the BMS judges whether the second message reception times out.

Specifically, the BMS judges whether the second message is received within the preset time, and if the second message is not received within the preset time (or in other words, the reception times out), the BMS executes charge abnormality processing, for example, and the BMS controls the traction battery to stop charging.

If the BMS receives the second message within a preset time (or in other words, the reception does not time out), then step 680 is executed: the BMS regularly sends a third message including the battery state to the charging pile. As an example, the third message includes, but is not limited to, a battery state message (BSM) of the traction battery.

In an embodiment of the present application, as an alternative implementation, the charging method 600 may include all the step 610 to step 680 described above, and the order of steps in the charging method 600 is not specifically limited in the embodiment of the present application. For example, in some embodiments, step 650 and step 670 may also occur before step 630 and step 640.

According to the technical solution of the embodiment, in the process of charging the traction battery by the charging pile, the charging pile can receive a first message for indicating that the traction battery is normal, and the BMS can receive a second message for indicating that the charging pile is normal. Through the state information interaction between charging pile and the BMS, the charging safety is further ensured.

In other alternative embodiments, the charging method 600 may also include only some of the steps 610 to 680 described above, for example, on the basis of including steps 610, 620, and 660, steps 630 and 640 are further included, or steps 650 to 680 are further included.

Specific embodiments of the charging method provided by the present application have been described above with reference to FIGS. 2 to 6, and the specific embodiments of the charging device provided by the present application will be described below with reference to FIGS. 7 to 9. It is understood that the related description in the following embodiments can refer to the foregoing embodiments and will not be repeated here for the sake of brevity.

Figure 7:
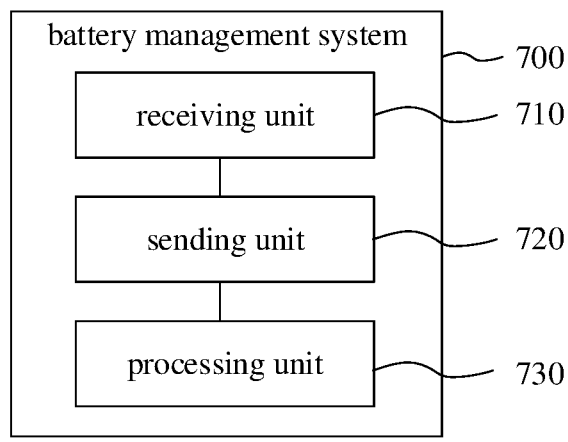
FIG. 7 is a schematic block diagram of a battery management system disclosed in an embodiment of the present application.

FIG. 7 shows a schematic structural block diagram of a battery management system BMS 700 according to one embodiment of the present application. Optionally, the BMS 700 may be the BMS shown in FIG. 1.

As shown in FIG. 7, the battery management system BMS 700 includes a receiving unit 710 and a sending unit 720.

Specifically, the receiving unit 710 is configured to acquire a state parameter of a traction battery, the state parameter including a battery temperature; the sending unit 720 is configured to send first charging mode demand information to a charging pile when the battery temperature is lower than a first preset threshold, where the first charging mode demand information is used for indicating a pulse charging mode, the pulse charging mode is a charging mode using a pulsed voltage or a pulsed current, and the pulsed voltage or the pulsed current is used for charging the traction battery.

Optionally, the sending unit 720 is further configured to: send second charging mode demand information to the charging pile when the battery temperature is not lower than the first preset threshold, where the second charging mode demand information is used for indicating a direct current charging mode, the direct current charging mode is a charging mode using a constant voltage or a constant current, and the constant voltage or a constant current is used for charging the traction battery.

Optionally, the state parameter also includes a battery voltage, and the sending unit 720 is configured to: send the first charging mode demand information to the charging pile when the battery temperature is lower than the first preset threshold and the battery voltage is lower than a second preset threshold.

Optionally, the state parameter also includes a battery voltage, and the sending unitc720 is configured to: send the second charging mode demand information to the charging pile when the battery temperature is not lower than the first preset threshold or the battery voltage is not lower than the second preset threshold.

Optionally, the first charging mode demand information includes at least one of following information: pulse current demand information, pulse voltage demand information, pulse direction demand information and pulse frequency demand information, and the first charging mode demand information is determined according to the battery temperature and a state-of-charge of the traction battery.

Optionally, the receiving unit 710 is further configured to: receive an output capability message sent by the charging pile, where the output capability message is used for carrying a first charging parameter of the charging pile in the pulse charging mode. The battery management system 700 further includes a processing unit 730, and the processing unit 730 is configured to confirm that the charging pile matches the traction battery according to the first charging parameter.

Optionally, the first charging parameter includes at least one of following parameters: a minimum pulse charging current, a minimum pulse charging voltage, a minimum pulse charging frequency, a maximum pulse charging current, a maximum pulse charging voltage, a maximum pulse charging frequency, and a pulse waveform that can be output.

Optionally, the sending unit 720 is further configured to: send a charging parameter message to the charging pile, where the charging parameter message is used for carrying a second charging parameter allowed by the traction battery in the pulse charging mode, and the second charging parameter is used for judging whether the traction battery matches the charging pile.

Optionally, the second charging parameter includes at least one of following parameters: a maximum allowable pulse charging current, a maximum allowable pulse charging voltage, and a maximum allowable pulse charging frequency.

Optionally, the sending unit 720 is further configured to: regularly send a first message to the charging pile, where the first message is used for indicating that the traction battery is normal.

Optionally, the first message includes a battery charging state message, where the battery charging state message is used for carrying a battery charging state of the traction battery in a pulse charge mode, and the battery charging state includes at least one of the following state values: a pulse charge current measurement value, a pulse charge voltage measurement value, a pulse measurement direction, and a pulse frequency measurement value.

Optionally, the receiving unit 710 is further configured to: regularly receive the second message sent by the charging pile, where the second message is used for indicating that the charging pile is normal.

Optionally, the second message includes a charging pile charging state message, where the charging pile charging state message is used for carrying a charging pile charging state of the charging pile in a pulse charging mode, and the charging pile charging state includes at least one of the following state values: a pulse charging current output value, a pulse charging voltage output value, a pulse direction, and a pulse frequency output value.

Optionally, the sending unit 720 is configured to: send a charging inhibition message to the charging pile when the battery temperature is lower than the first preset threshold; and send first charging mode demand information to the charging pile, where the charging prohibition message is used for instructing the charging pile to stop outputting power to the traction battery.

Figure 8:
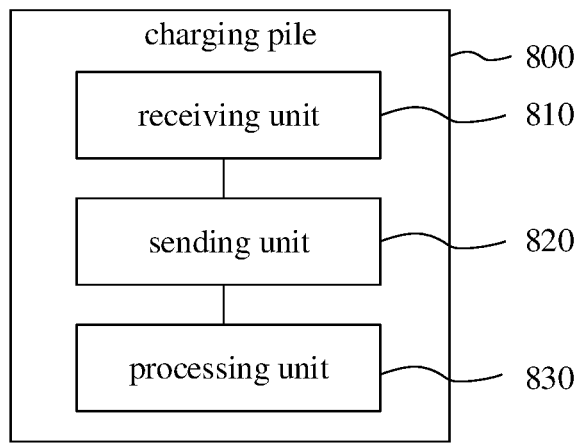
FIG. 8 is a schematic block diagram of a charging pile disclosed in an embodiment of the present application.

FIG. 8 shows a schematic structural block diagram of a charging pile 800 according to one embodiment of the present application. Optionally, the charging pile 800 may be the charging pile shown in FIG. 1.

As shown in FIG. 8, the charging pile 800 includes a receiving unit 810 and a processing unit 830.

Specifically, the receiving unit 810 is configured to: receive first charging mode demand information sent by the battery management system of the traction battery, where the first charging mode demand information is used for indicating the pulse charging mode, and the first charging mode demand information is the information sent by the battery management system when the battery temperature of the traction battery is lower than the first preset threshold; and the processing unit 830 is configured to charge the traction battery using a pulsed voltage or a pulsed current in the pulse charging mode.

Optionally, the receiving unit 810 is further configured to: receive second charging mode demand information sent by the battery management system, where the second charging mode demand information is used for indicating the direct current charging mode, and the second charging mode demand information is information sent by the battery management system when the battery temperature of the traction battery is not lower than the first preset threshold; and the processing unit 830 is further configured to charge the traction battery using the direct current charging mode, where direct current charging mode is a charging mode using a constant voltage or a constant current.

Optionally, the first charging mode demand information is information sent by the battery management system according to the battery temperature of the traction battery being lower than the first preset threshold and a battery voltage of the traction battery being lower than the second preset threshold.

Optionally, the second charging mode demand information is information sent by the battery management system according to the battery temperature of the traction battery being not lower than the first preset threshold, or a battery voltage of the traction battery being not lower than the second preset threshold.

Optionally, the first charging mode demand information includes at least one of following information: pulse current demand information, pulse voltage demand information, pulse direction demand information, pulse frequency demand information, and pulse time demand information, and the first charging mode demand information is determined according to a battery temperature and a battery state-of-charge of the traction battery.

Optionally, the charging pile 800 further includes: a sending unit 820, where the sending unit 820 is configured to send an output capability message to the battery management system, the output capability message is used for carrying a first charging parameter of the charging pile in the pulse charging mode, where the first charging parameter is used for judging whether the charging pile matches the traction battery.

Optionally, the first charging parameter includes at least one of following parameters: a minimum pulse charging current, a minimum pulse charging voltage, a minimum pulse charging frequency, a maximum pulse charging current, a maximum pulse charging voltage, a maximum pulse charging frequency, and a pulse waveform that can be output.

Optionally, the receiving unit 810 is further configured to: receive a charging parameter message sent by the battery management system, where the charging parameter message is used for carrying a second charging parameter allowed by the traction battery in the pulse charging mode; and the processing unit 830 is further configured to confirm that the traction battery matches the charging pile according to the second charging parameter.

Optionally, the second charging parameter includes at least one of following parameters: a maximum allowable pulse charging current, a maximum allowable pulse charging voltage, and a maximum allowable pulse charging frequency.

Optionally, the receiving unit 810 is further configured to receive the first message sent by the battery management system regularly, and the first message is used for indicating that the traction battery is normal.

Optionally, the first message includes a battery charging state message, where the battery charging state message is used for carrying a battery charging state of the traction battery in a pulse charge mode, and the battery charging state includes at least one of the following state values: a pulse charge current measurement value, a pulse charge voltage measurement value, a pulse measurement direction, and a pulse frequency measurement value.

Optionally, the sending unit 820 is configured to send a second message to the battery management system regularly, and the second message is used for indicating that the charging pile is normal.

Optionally, the second message includes a charging pile charging state message, where the charging pile charging state message is used for carrying a charging pile charging state of the charging pile in a pulse charging mode, and the charging pile charging state includes at least one of the following state values: a pulse charging current output value, a pulse charging voltage output value, a pulse direction, and a pulse frequency output value.

Optionally, the receiving unit 810 is further configured to: receive a charging inhibition message sent by the battery management system, where the charging inhibition message is used for indicating stopping outputting battery output power to the traction battery, and the charging inhibition message is information sent by the battery management system when the battery temperature of the traction battery is lower than a first preset threshold.

Figure 9:
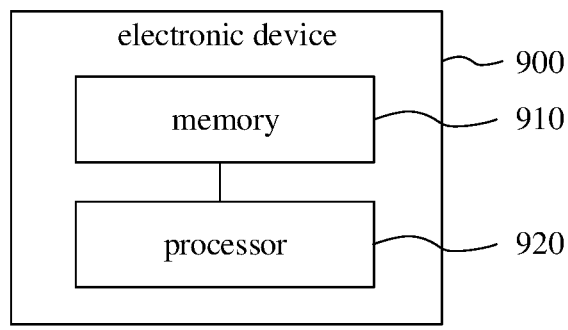
FIG. 9 is a schematic block diagram of an electronic device disclosed in an embodiment of the present application.

FIG. 9 shows a schematic block diagram of an electronic device 900 of another embodiment of the present application. As shown in FIG. 9, the electronic device 900 includes a memory 910 and a processor 920. The memory 910 is configured to store a computer program, and the processor 920 is configured to read the computer program and execute the methods of various embodiments of the present application described above based on the computer program.

In some possible embodiments, the electronic device 900 may be used for a battery management system (BMS) or a charge pile respectively for executing the methods corresponding to the BMS or charge pile in various embodiments of the present application described above.

In addition, an embodiment of the present application also provides a readable storage medium for storing a computer program, and the computer program is used for executing the methods of various embodiments of the present application. Optionally, the computer program may be a computer program in a charging pile and/or a battery management system BMS.

It should be understood that the specific examples herein are only intended to assist those skilled in the art to better understand the embodiments of the present application and are not intended to limit the scope of the embodiments of the present application.

It should also be understood that in various embodiments of the present application, the serial number of each process does not mean the sequence of execution, and the execution sequence of each process should be determined by its function and internal logic, and should not constitute any limitation on the implementation process of the embodiments of the present application.

It should also be understood that the various embodiments described in this specification may be implemented individually or in combination, and the embodiments of this application are not limited thereto.

Although the present application has been described with reference to preferred embodiments various modifications may be made thereto and components therein may be replaced with equivalents without departing from the scope of the present application. In particular, the various technical features mentioned in the various embodiments may be combined in any manner so long as there is no structural conflict. The present application is not limited to the specific embodiments disclosed herein but includes all technical solutions falling within the scope of the claims.

What is claimed is:

1. A charging method, comprising:
acquiring a state parameter of a traction battery, the state parameter comprising a battery temperature and a state of charge (SOC) of the traction battery;
sending first charging mode demand information to a charging pile when the battery temperature is lower than a first preset threshold, wherein the first charging mode demand information is used for indicating a pulse charging mode, the pulse charging mode is a charging mode using a pulsed voltage or a pulsed current, and the pulsed voltage or the pulsed current is used for charging the traction battery, the first charging mode demand information comprises pulse electricity information in the pulse charging mode, the pulse electricity information comprises at least one of following information: pulse current demand information, pulse voltage demand information, pulse direction demand information and pulse frequency demand information, and the pulse electricity information is determined according to a predetermined mapping relationship of the battery temperature, the SOC, and pulse charging information;
receiving the pulsed voltage or the pulsed current output by the charging pile according to the pulse electricity information;
wherein before the sending first charging mode demand information to a charging pile, the method further comprises:
receiving an output capability message sent by the charging pile, the output capability message being used for carrying a first charging parameter of the charging pile in the pulse charging mode, the first charging parameter comprises at least one of following parameters: a minimum pulse charging current, a minimum pulse charging voltage, a minimum pulse charging frequency and a maximum pulse charging frequency;
judging a matching condition between the charging pile and the traction battery according to the first charging parameter;
the sending first charging mode demand information to a charging pile comprises:
sending the first charging mode demand information to the charging pile in the case that the charging pile matches the traction battery.

2. The method according to claim 1, wherein the state parameter further comprises a battery voltage, and the sending first charging mode demand information to a charging pile when the battery temperature is lower than a first preset threshold comprises:
sending the first charging mode demand information to the charging pile when the battery temperature is lower than the first preset threshold and the battery voltage is lower than a second preset threshold.

3. The method according to claim 1, wherein the first charging parameter comprises at least one of following parameters: a maximum pulse charging current, a maximum pulse charging voltage and a pulse waveform that can be output.

4. The method according to claim 1, wherein the sending first charging mode demand information to a charging pile when the battery temperature is lower than a first preset threshold comprises:

sending a charging inhibition message to the charging pile when the battery temperature is lower than the first preset threshold; and
sending the first charging mode demand information to the charging pile;
wherein the charging inhibition message is used for indicating that the charging pile stops outputting power to the traction battery.

5. A battery management system of a traction battery, comprising a processor and a memory, the memory configured to store a computer program, and the processor configured to call the computer program to execute the charging method according to claim 1.

6. The method according to claim 1, wherein the method further comprises:
in the case that the charging pile matches the traction battery, sending a ready message to the charging pile, the ready message indicating that the traction battery is ready to start charging.

7. The method according to claim 1, wherein the judging a matching condition between the charging pile and the traction battery according to the first charging parameter comprises:
comparing a pulse electricity parameter allowed by the traction battery with the first charging parameter, to judge whether the traction battery matches the charging pile.

8. The method according to claim 1, wherein before the sending first charging mode demand information to a charging pile, the method further comprises:
sending a charging parameter message to the charging pile, the charging parameter message being used for carrying a second charging parameter allowed by the traction battery in the pulse charging mode, and the second charging parameter being used for judging whether the traction battery matches the charging pile.

9. The method according to claim 8, wherein the second charging parameter comprises at least one of following parameters: a maximum allowable pulse charging current, a maximum allowable pulse charging voltage, and a maximum allowable pulse charging frequency.

10. The method according to claim 1, wherein the method further comprises:
sending a first message to the charging pile regularly, the first message being used for indicating that the traction battery is normal.

11. The method according to claim 10, wherein the first message comprises a battery charging state message, the battery charging state message being used for carrying the battery charging state of the traction battery in the pulse charging mode, and the battery charging state comprising at least one of following state value: a pulse charging current measurement value, a pulse charging voltage measurement value, a pulse measurement direction, and a pulse frequency measurement value.

12. The method according to claim 1, wherein the method further comprises:
receiving a second message sent by the charging pile regularly, the second message being used for indicating that the charging pile is normal.

13. The method according to claim 12, wherein the second message comprises a charging pile charging state message, the charging pile charging state message being used for carrying a charging pile charging state of the charging pile in the pulse charging mode, and the charging pile charging state comprising at least one of following state values: a pulse charging current output value, a pulse charging voltage output value, a pulse direction, and a pulse frequency output value.

14. The method according to claim 1, wherein the method further comprises:
sending second charging mode demand information to the charging pile when the battery temperature is not lower than the first preset threshold, wherein the second charging mode demand information is used for indicating a direct current charging mode, the direct current charging mode is a charging mode using a constant voltage or a constant current, the constant voltage or constant current is used for charging the traction battery.

15. The method according to claim 14, wherein the state parameter further comprises a battery voltage, and the sending second charging mode demand information to the charging pile when the battery temperature is not lower than the first preset threshold comprises:
sending the second charging mode demand information to the charging pile when the battery temperature is not lower than the first preset threshold or the battery voltage is not lower than the second preset threshold.

16. The method according to claim 14, further comprising:
sending a third message to the charging pile regularly, the third message comprising a battery state, and the third message being a battery state message of the traction battery.

17. A method for charging a traction battery, performed by a battery management system in communication with a charging pile, the method comprising:
acquiring a state parameter of the traction battery, the state parameter comprising a battery temperature of the traction battery and a state of charge (SOC) of the traction battery;
sending, to the charging pile, first charging mode demand information, wherein the first charging mode demand information indicates a pulse charging mode for the charging pile to charge the traction battery using a pulsed voltage or a pulsed current, the first charging mode demand information comprises pulse electricity information in the pulse charging mode, the pulse electricity information comprises at least one of following information: pulse current demand information, pulse voltage demand information, pulse direction demand information and pulse frequency demand information, and the pulse electricity information is determined according to a predetermined mapping relationship of the battery temperature, the SOC, and pulse charging information;
receiving, from the charging pile, a response message indicating that the charging pile supports the pulse charging mode according to the first charging mode demand information;
sending a charging inhibition message to the charging pile when the battery temperature is not lower than the first preset threshold, the charging inhibition message being used for indicating that the charging pile stops outputting power to the traction battery; and
after sending the charging inhibition message, sending, to the charging pile, second charging mode demand information when the battery temperature is not lower than the first preset threshold, the second charging mode demand information indicating a direct current charging mode for the charging pile to charge the traction battery using a constant voltage or a constant current.

18. The method of claim 17, further comprising:
sending, to the charging pile, a first message at regular intervals, the first message including a battery charging state message, the battery charging state message being used for indicating that the traction battery is in a normal state and carrying the battery charging state of the traction battery in the pulse charging mode, and the battery charging state including at least one of: a pulse charging current measurement value, a pulse charging voltage measurement value, a pulse measurement direction, and a pulse frequency measurement value.

19. The method of claim 18, further comprising:
receiving, from the charging pile, a second message at regular intervals, the second message being used to indicate that the charging pile is in a normal state, the second message including a charging pile charging state message, the charging pile charging state message being used for carrying a charging pile charging state of the charging pile in the pulse charging mode, and the charging pile charging state including at least one of: a pulse charging current output value, a pulse charging voltage output value, a pulse direction, and a pulse frequency output value.

\* \* \* \* \*